(12) United States Patent
Bosch Blumenfeld

(10) Patent No.: US 12,182,727 B2
(45) Date of Patent: Dec. 31, 2024

(54) LOCALIZED FULL WAVEFORM INVERSION USING SYNTHETIC ENERGY FOCUSING

(71) Applicant: Miguel Eduardo Bosch Blumenfeld, Houston, TX (US)

(72) Inventor: Miguel Eduardo Bosch Blumenfeld, Houston, TX (US)

(*) Notice: Subject to any disclaimer, the term of this patent is extended or adjusted under 35 U.S.C. 154(b) by 1033 days.

(21) Appl. No.: 16/989,658

(22) Filed: Aug. 10, 2020

(65) Prior Publication Data

US 2021/0049485 A1  Feb. 18, 2021

Related U.S. Application Data

(60) Provisional application No. 62/943,105, filed on Dec. 3, 2019, provisional application No. 62/887,840, filed on Aug. 16, 2019.

(51) Int. Cl.
*G06N 5/04* (2023.01)

(52) U.S. Cl.
CPC ...................................... *G06N 5/04* (2013.01)

(58) Field of Classification Search
CPC ................................. G06N 5/04; G06N 3/08
See application file for complete search history.

(56) References Cited

U.S. PATENT DOCUMENTS

| | | | |
|---|---|---|---|
| 6,327,537 B1 | 12/2001 | Ikelle | |
| 6,822,234 B2 | 11/2004 | Soeda | |
| 7,016,261 B2 | 3/2006 | Quinn et al. | |
| 7,104,357 B2 | 9/2006 | Baroni et al. | |
| 7,448,998 B2 | 11/2008 | Robinson | |
| 8,235,906 B2 | 8/2012 | Madore | |
| 8,535,249 B2 | 9/2013 | Uebelacker et al. | |
| 8,748,817 B2 | 6/2014 | Kumar | |
| 8,775,143 B2 | 7/2014 | Routh et al. | |

(Continued)

OTHER PUBLICATIONS

Asnaashari et al., Regularized Seismic Full Waveform Inversion with Prior Model Information, Mar.-Apr. 2013, Geophysics, vol. 78, No. 2, pp. R25-R36 (Year: 2013).*

(Continued)

*Primary Examiner* — Mohamed Charioui
*Assistant Examiner* — Xiuqin Sun

(57) ABSTRACT

Method estimating property fields based on full waveform inversion (FWI) of synthetic wave-fronts converging to a focal zone within the media volume. The wave-fronts are generated from multipoint focused macro sources (FMSs) directing the propagating energy to the focal zone. Two focusing macro-source configurations are disclosed: (1) a convergent FMS characterized by primary pseudo elliptical wave-fronts and (2) a set of beam FMSs of pseudo-planar wave-front that illuminates the focal point from different directions. The FMSs are synthetized from the data set recorded by superposing (adding) the recorded data after the corresponding time-shifts and amplitude weighs. The sensitivity of the FMS data is spatially localized in this invention, being maximal around the focal and negligible at locations far from the focal zone. The localized FWI method disclosed involves an important reduction in computational cost compared to the global solution of the FWI problem in the complete volume under exploration.

20 Claims, 13 Drawing Sheets

2A   2B

(56) References Cited

U.S. PATENT DOCUMENTS

| | | |
|---|---|---|
| 9,244,181 B2 | 1/2016 | Rickett et al. |
| 9,304,224 B2 | 4/2016 | Guigne |
| 9,392,992 B2 | 7/2016 | Hsu et al. |
| 9,594,176 B1 | 3/2017 | Popovici et al. |
| 9,702,998 B2 | 7/2017 | Bansal et al. |
| 10,064,598 B2 | 9/2018 | Rice et al. |
| 10,166,410 B2 | 1/2019 | Liu et al. |
| 10,310,123 B2 | 6/2019 | Xu et al. |
| 10,324,205 B2 | 6/2019 | Wang et al. |
| 10,670,751 B2 | 6/2020 | Qin et al. |

OTHER PUBLICATIONS

Nuber et al., "Optimizing measurement geometry for seismic near-surface full waveform inversion", Geophys. J. Int. (2017) 210, 1909-1921 (Year: 2017).*

Hamamoto et al., "Full Waveform Inversion based on Genetic Local Search Algorithm with Hybrid-Grid Scheme", 2019 IEEE 9th Symposium on Computer Applications & Industrial Electronics (ISCAIE), Malaysia, 2019, pp. 1-5, doi: 10.1109/ISCAIE.2019.8743763 (Year: 2019).*

* cited by examiner 8A    8B 12A 12B 13A          13B

LOCALIZED FULL WAVEFORM INVERSION USING SYNTHETIC ENERGY FOCUSING

CROSS-REFERENCE TO RELATED APPLICATIONS

This application claims priority to U.S. Provisional Patent Application No. 62/887,840 filed Aug. 16, 2019 and U.S. Provisional Patent Application No. 62/943,105 filed Dec. 3, 2019. The foregoing applications are hereby incorporated by reference in their entirety.

FEDERALLY SPONSORED RESEARCH OR DEVELOPMENT

Not applicable.

TECHNICAL FIELD

The present disclosure relates to the inference of medium property fields based on data measured from wave propagation, and in particular, to the efficiency of the data processing methods needed for the estimation of the medium property fields.

BACKGROUND

Full Waveform Inversion (FWI) is a method proposed by Tarantola (1984, 1986) for solving the estimation of elastic medium parameters based on recorded seismic data. A review of the principles of FWI and other common seismic inversion methods is included in the work by Bosch (2017). The first implementations of the FWI were for the acoustic model (Lailly, 1983; Gautier et al., 1986; Pica et al., 1990), followed by the elastic isotropic formulation (Mora, 1987; Virieux and Operto, 2009; Operto et al., 2013; Virieux et al., 2017). The FWI method is based on modeling the complete wave phenomenon (including direct reflections, multiples, diffractions, tube waves, surface waves) from the basic dynamic equations of the continuum media, and hence, it is free from reduction assumptions of other common seismic inversion approaches. This is a major advantage of the FWI method implying improved exactitude in the property estimates. In addition, simplified seismic inversion methods reduce dimensionality of the seismic data by extensive pre-processing involving procedures such as seismic migration. These pre-processes commonly introduce implicit errors into the consecutive property estimation stage. The FWI includes the modeling of the propagation of the waves through the medium, requiring much less pre-processing of the acquired data, which results in improved precision of the property estimates.

The application of FWI in upstream oil and gas industry has been increasing and it is an active subject of development. Example applications for sedimentary media are described by Vigh and Starr (2008), Barnes and Charara (2009), Barnes et al. (2010), Guitton et al. (2012), Asnaashari et al. (2013), Queiber and Singh, 2013, Owusu et al., 2015, Raknes et al., 2015 and Mancini et al., 2016. Examples of technical developments in FWI are also present in patented work, as described by Xu et al. (2019), Bansal et al. (2017) and Rickett and Childs (2016). As counterpart of the advantages of the FWI, the industrial applications of the method to true size field cases, complete seismic data and seismic phases, still present limitations.

These limitations are essentially related to the large computational cost and running time involved in the full dynamic modeling and the inverse processes required to estimate the model parameters. The FWI method involves much larger computations and memory requirements than simplified methods of analysis of the seismic data, such as reflection seismic inversion and travel time seismic tomography (Bosch, 2017). The computational resources needed increase sharply with the modeled seismic data frequency and space dimensionality (3D surveys). Reducing these limitations and adapting the FWI technique to the adequate seismic frequency band needed for reservoir characterization and large size industry problems is presently a matter of active research and development.

The common seismic survey data acquisition procedure consists of generating artificial seismic sources (e.g., by explosives, air-guns, vibrators) in a series of points in the earth surface (solid or water bodies). The seismic signal propagates through the heterogeneous medium generating reflections, diffractions, and other wave conversion phenomena that radiates a portion of the seismic energy back to the surface. An array of seismic receivers records the medium perturbations including the upgoing energy that carries information about the medium heterogeneities. Due to the wave phenomenology, the seismic energy introduced to the medium at the artificial punctual source propagates away from the source in all directions causing a progressive reduction of the energy intensity of the wave-fronts with the distance to the source. This is known as geometric energy spreading. Additional attenuation of the intensity is due to dispersion phenomena (e.g., diffractions, reflections, wave-conversions) and medium energy absorption.

The array of seismic sources and receivers are designed to illuminate (radiate) through a given volume of the earth crust that is under prospection for the identification and interpretation of oil and gas reservoirs. Commonly, they are arranged in a pseudo regular grid distributed in the upper surface of the volume on prospection, although other configurations can be also used. The seismic survey is a collection of a series of similar experiments consisting of activating a punctual seismic source (commonly referred to as "firing a shot") and recording along several seconds the medium reaction to this shot at the network of receivers (in the geophysical jargon referred as recording a "common shot trace gather" or "seismogram").

The estimation of the elastic medium properties is commonly performed in the FWI method with an iterative optimization approach by: parameterizing the properties in a regular grid of points within the prospected volume, assuming an initial configuration of the elastic properties, numerically modeling the propagation and data collected for each shot at the corresponding receiver locations, comparing the modeling and observed data (seismograms) for all sources or subsets of the sources, implementing a procedure to modify the elastic property configuration in order to improve the observed and calculated data fit, and iterating until a satisfactory observed-calculated data fit for all seismograms is reached. For the calculation of the model update above, several methods involving objective function first or second order iterative approximations, or Monte Carlo sampling have been developed; reviews of various FWI methods are presented by Virieux and Operto (2009) and Operto et al. (2013). Also, sampling approaches for the FWI can be applied, although in common implementations the computational cost tends to be larger than for the optimization approach.

The above described FWI procedure is intrinsically global (i.e., all data and medium locations should be processed together) because a local perturbation of the medium parameters affects the data (seismograms) of a large portion of shots. This is due to the geometric spreading of the primary energy emitted with a punctual source. The non-localized characteristics of common FWI approaches is one of the factors that contributes to the computational burden of the method. Several strategies have been proposed to overcome the computational burden of the FWI method for standard industrial applications. One of the approaches is to arrange the data in such a way to model several combined shots together, using the wave superposition principle. Examples of this approach are in Routh et al. (2014), which describes an encoding method for combining various shot data, and Vigh and Starr (2008), which composes pseudo plane waves in a collection of incident angles and azimuths, adding up the recorded data from all the sources. Some of these strategies produce an improvement in computation efficiency. However, a larger breakthrough in efficiency is required to place the FWI as a standard procedure in analyzing the seismic data at the resolution required for reservoir characterization.

In general, a property field is a function defined in the continuous 3D or 2D space that provides the value of the property at any location in the space. In inference problems, the property field is constructed by a property model and a finite set of property model parameters. The property model involves a series of rules (e.g., interpolation, combination of base functions) to unambiguously define the property field from the property model parameters. The method is known as the property field model parameterization. Thus, a particular set of property model parameters define a particular configuration of the property field. In the scope of the present disclosure, the inference or estimation of the property model parameters is equivalent to the inference or estimation of the property field.

The property fields to be inferred with the FWI method are directly related with the dynamics of the wave propagation. In addition, other property fields indirectly related can be inferred, including but not limited to reservoir property fields related to the former via correlations or rock physics models. In the setting of an isotropic elastic model, the property fields directly related with the dynamics are the mass density field and two elastic property fields. There are several isotropic elastic properties defined, including but not limited to the compressional seismic velocity, the shear seismic velocity, the bulk modulus, the shear modulus, the acoustic impedance, the elastic impedance, lambda Lame modulus and other combinations and ratios of them. They are interrelated in such a way that calculating any two of them allows for the calculation of the rest of them. In the more general setting of anisotropic elasticity the full elastic tensor needs to be considered, and the number of independent elastic parameters depend on the type of anisotropy.

Although originally developed in the setting of seismic wave data applied to oil and gas exploration, the FWI method is useful in the analysis of data obtained from any wave phenomenon, including but not limited to electromagnetic, sonic, ultrasonic or surface waves. For example, in the field of electromagnetic radar, a large number of applications have been described (e.g. Moghaddam et al., 1991; Jia et al., 2002; Ersnt et al., 2005, 2007; Cordua et al. 2012). The invention described herein includes embodiments for elastic seismic wave surveys applied to earth medium prospection. However, as the principia involved are common to any wave propagation phenomenon, the invention is equally applicable to data collected from any other wave phenomenon or applied to another scale or media.

SUMMARY

The invention involves point sources and corresponding recorded data sets, using the wave superposition principle, to generate synthetic macro-sources that focus the radiated primary energy to a predefined zone within the explored volume. The energy focusing can be achieved per macro source or jointly per the combined effect of a set of macro sources, with the purpose of increasing the cumulative transmitted energy at a selected target zone within the volume. Due to the energy spatial focusing, the sensitivity of the combined macro data to the model parameters is maximal for the target zone facilitating a localized implementation of the FWI problem. Although the FWI problem is spatially global, the energy focusing method allows a convenient approximation to a localized solution with a major reduction in the involved computational burden. The invention is oriented to provide high resolution of the model parameters (commensurate with the data resolution) in the target zone, which is useful for property and structure characterization.

The invention is based on constructing a multi-point seismic source media response by superposing the seismic sources activated in the field survey with appropriate time delays and amplitude weights to focus the transmitted seismic energy in a preestablished sector in the earth volume. The invention discloses two types of source designs to achieve the energy focusing: (1) macro sources of convergent wave-front geometry that individually focus the energy to a prescribed focal point, and (2) a collection of beam macro sources of pseudo-planar wave-front geometry that jointly direct the energy to a prescribed focal zone.

In the first focusing design, the constructed multi-point source is referred to as the "convergent focused macro source" or "CFMS" and the focal point of convergence of the primary wave front is referred to as the "CFMS focus point." The time delays ensure the wave front convergence to the focal point while the source amplitude weights regulate the energy intensity solid angle distribution of the convergent front to optimal energy focusing. Applying the superposition principle, the media response to the CFMS at each receptor is obtained by the weighted addition of the corresponding point-source responses with appropriate time delays. The constructed media response is referred to as the "CFMS observed gather." The FWI procedure is then implemented by modeling the focused macro sources and inverting the corresponding CFMS observed gathers. The CFMS is not implemented physically in the field, as practical procedures require separate activation and recording of the point sources. The CFMS and the corresponding observed gather are constructed computationally from the point source field recordings. The superposition principle warrants that the CFMS observed gather reproduces the media response should the CFMS be used in the field experiment.

In the second focusing design, the constructed multi-point source is referred to as the "beam focused macro source" or "BFMS," and at least two BFMSs are used jointly to focus the cumulative radiated energy in a sector of the earth volume with a prescribed center, which is referred as the "BFMS focus point" or "target point." The wave-front geometry of the BFMS is pseudo planar with a prescribed approximate section area and direction (azimuth and inclination) of arrival to the focus point. Each BFMS radiates the energy towards the target point with small spatial energy spreading preserving the wave intensity as the wave-front propagates. To increase the cumulative energy received at the focal zone, at least the illumination of two beams with different incident directions are required; the larger the number of beams arriving from different directions, the larger the total intensity received at the focal point area relative to the surrounding areas. For the purpose of the FWI, the method does not require that BFMSs primary wave-fronts arrive simultaneously to the focal point; they are modeled separately. Applying the superposition principle, the media response to the BFMS at each receptor is obtained by the weighted addition of the corresponding point-source responses with appropriate time delays. The constructed media response will be referred here as the "BFMS observed gather."

In the present disclosure, any macro source designed with the purpose of focusing the primary transmitted energy over a particular zone or point of the volume, individually or jointly with other macro sources, will be referred to as a "focused macro source" or "FMS," wherever it is not relevant to specify the convergent, plane beam, or other geometry of the macro source wave-front design. The corresponding point that describes the prescribed focal location is referred to as the "FMS focus," and the correspondent observed data constructed by the superposition principle from point sources original observations is referred to as the "FMS observed gather." Once a set of FMSs has been defined and the corresponding FMSs observed gathers calculated, the FWI procedure is implemented by modeling the FMSs and inverting the corresponding FMS observed gathers. As mentioned before, the FMS is not implemented physically in the field. The FMS and the corresponding observed gather are constructed computationally from the point source field recordings. The superposition principle warrants that the FMS gather reproduces the media response should the FMS be used in the field experiment.

The invention includes distributing in the target zone at least one focus point and designing from the surveyed point-sources the corresponding set of FMSs, synthetizing in the computer the FMS observed gather corresponding to each one of the FMS based on the receivers field recordings for the pointwise field sources, and implementing the FWI using as input data the set of FMS and FMS observed gathers. The construction of the set of FMS and FMS observed gathers can be made at the beginning of the process or can be updated at intermediate stages of the inversion process to take advantage of the velocity model improvement. In the examples provided, the forward numerical modeling of each FMS is computed separately. Equivalently, in other embodiments it can be computed by continuous forward modeling of a sequence of FMSs separated with time delays or by other FMS superposition settings. As this invention involves a combination strategy regarding the observed data and sources, it is equally useful with any type of forward seismic modeling technique, specific formulation of the objective function, or inverse solution algorithm employed.

An additional aspect of the invention is the use of model parameters at more than one spatial resolution. In preferred embodiments, the property fields are parameterized at two spatial resolutions: a lower resolution corresponding to the model property description in space commensurate with the seismic data spatial resolution, and a higher resolution appropriate to the dynamic wave modeling grid. The two scales are coupled by a change of scale transform. Depending on the wave modeling method employed, it is also possible to use non-regular grids or more than one grid, with different spatial resolutions, for modeling specific wave phases (e.g., S-waves, surface waves) characterized by different wave velocities. It is also possible to include additional extra low spatial resolution property model parameters to describe the long-range trends of the property field.

Unless otherwise defined, all terms used herein have the same meaning as commonly understood by a person having ordinary skill in the art to which the invention pertains. All patents, patent applications, publications, and other references mentioned herein and/or listed in the Application Data Sheet are hereby incorporated by reference in their entirety. In case of conflict, the specification will control. When a range of values is provided, the range includes the end values.

The materials, methods, components, features, embodiments, examples, and drawings disclosed herein are illustrative only and not intended to be limiting.

DESCRIPTION OF DRAWINGS

The invention is best understood from the following detailed description when read in connection with the drawings disclosed herein, with similar elements having the same reference numbers. When a plurality (at least two) of similar elements are present, a single reference number may be assigned to the plurality of similar elements with a small letter designation referring to at least one specific similar element. When referring to the similar elements collectively or to a non-specific similar element, the small letter designation may be dropped. The various features of the drawings may not be drawn to scale and may be arbitrarily expanded or reduced for clarity. Included in the drawings are the following figures.

DEFINITIONS

Figure 1:
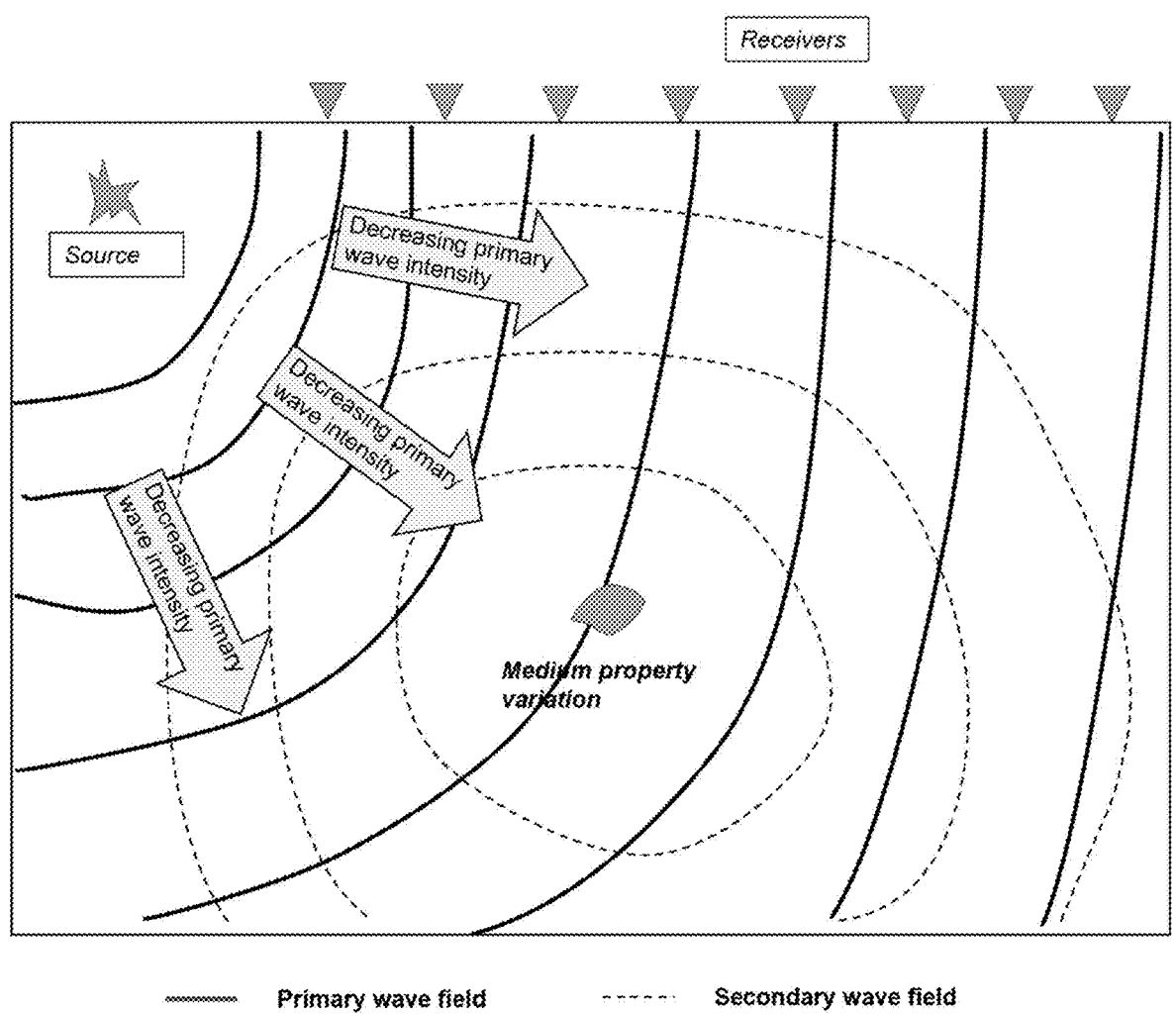
FIG. 1 depicts the common seismic survey data acquisition procedure that involves a source of medium equilibrium perturbation is activated in a point close to the medium surface (e.g., buried explosive, submerged air-gun, vibrator truck), primary and other wave-fronts propagate from the source point through the media, heterogeneities in the media property fields scatter the incident wave-fronts in all directions, and the medium response including the upward scattered field perturbations is recorded in a series of points were receivers are placed. The intensity of the wave-fronts emitted by the source decrease with the distance between the point source and the heterogeneity, in a phenomenon called geometric energy spreading.
Figure 2:
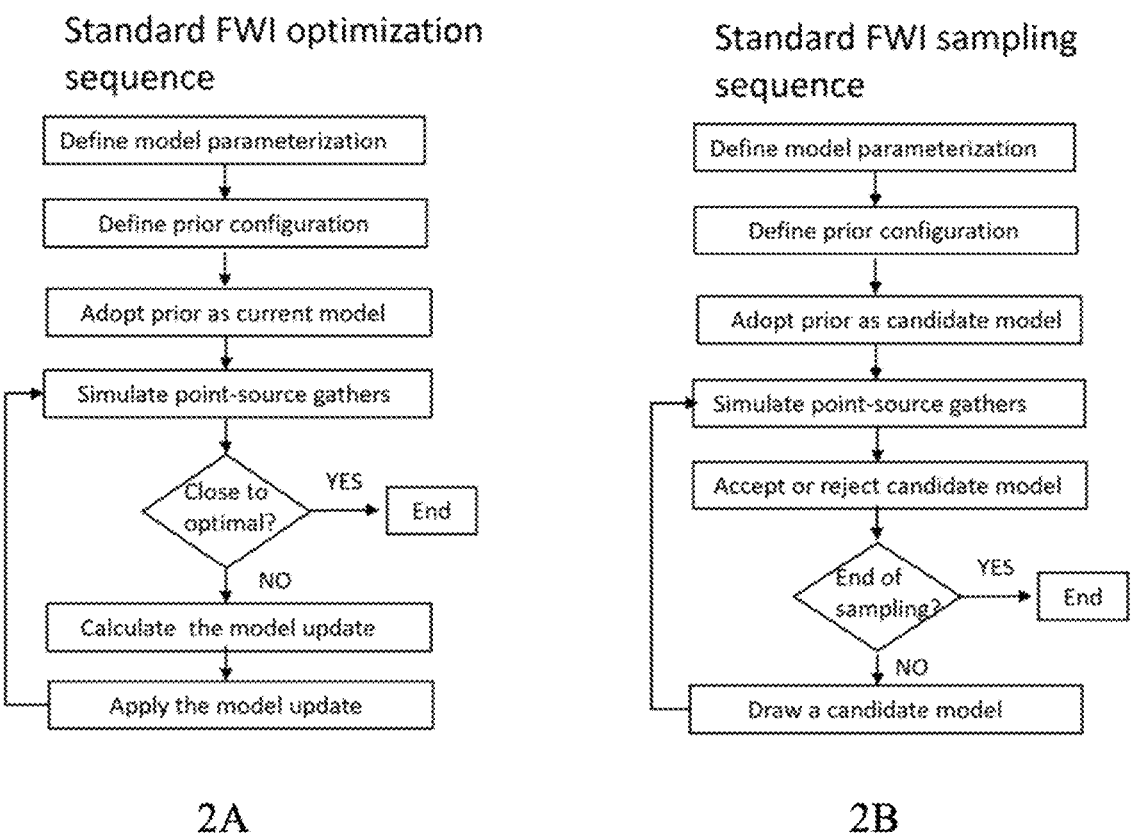
FIG. 2 shows a common workflow for the full waveform inversion procedure using an iterative optimization method (FIG. 2A), and a sampling method (FIG. 2B).

To facilitate understanding of the invention, a number of terms are defined herein.

"Configuration of the model parameters" or "realization of the model parameters" means a specific and complete set of values given to the model parameters.

"Configuration of the property field" or "realization of the property field" means the property field resulting from the configuration of the property model parameters.

"Estimation" means providing a value of a variable that is close to the expected value according to the probability density of the variable.

"Convergent Focused macro source" or "CFMS" means a collection of point-sources that are activated in sequence with appropriate time delays and amplitude weights to generate a convergent wave-front that focuses at a selected point in the volume.

"Beam Focused macro source" or "BFMS" means a collection of point-sources that are activated in sequence with appropriate time delays and amplitude weights to generate a pseudo plane wave-front of limited area section that propagates towards a selected point in the volume.

"Focused macro source" or "FMS" means a collection of point-sources that are activated in sequence with appropriate time delays and amplitude weights to generate a wave-front that individually, or jointly with other FMSs, increase the cumulative wave transmitted energy in a selected zone or point in the volume. This term includes BFMS, CFMS, and any other energy focusing macro source configuration.

"Focus point" or "focal point" or "target point" means the point where an FMS, individually or jointly with other FMSs, are directed to focus the cumulative transmitted wave energy.

"Focal zone" or "target zone" or "interest zone" means the region of the volume where an FMS, or a set of FMSs, produce an increase of the cumulative wave transmitted energy.

"Intensity" or "wave intensity" or "energy intensity" means the energy transmitted per unit time and unit area by the wave motion through a surface perpendicular to the wave direction of propagation.

"Cumulative transmitted energy" or "cumulative energy" or "cumulative delivered energy" means, at a point of the volume, the addition of the time integral of the wave intensity at the point for all FMS involved in the FWI estimation.

"Energy focusing" or "energy spatial focusing" or "FMS focusing" means a physical or modeled procedure that produces a larger cumulative transmitted energy in a selected zone of the medium by means of wave propagation from a wave source.

"Synthetic energy focusing" or "modeled energy focusing" means a computer elaborated procedure to simulate the physical response of an FMS using the wave superposition principle and the measured physical responses to a set of point sources.

"Focused macro source observed gather" or "FMS observed gather" means the response of the medium to an FMS computed from the experimental point source recorded data using the superposition principle.

"Focused macro source calculated gather" or "FMS calculated gather" means the theoretical seismic response of a medium with given property fields to an FMS computed by numerical simulation of the medium dynamics.

"Convergent focused macro source observed gather" or "CFMS observed gather" means the seismic response of the medium to an CFMS computed from the experimental point source recorded data using the superposition principle.

"Convergent focused macro source calculated gather" or "CFMS calculated gather" means the theoretical seismic response of a medium with given property fields to an CFMS computed by numerical simulation of the medium dynamics.

"Beam focused macro source observed gather" or "BFMS observed gather" means the seismic response of the medium to a BFMS computed from the experimental point source recorded data using the superposition principle.

"Beam focused macro source calculated gather" or "BFMS calculated gather" means the theoretical seismic response of a medium with given property fields to a BFMS computed by numerical simulation of the medium dynamics.

"High resolution grid" or "hi-resolution grid" or "higher resolution grid" means an accessorial grid of points with higher point density than the low-resolution grid, i.e., smaller separation within neighbor points, used herein for numerical dynamic modeling.

"Inference" means providing an approximate description of the probability density of a variable (e.g., expected value, standard deviation, higher moments of the probability density, histogram, deciles, centiles, model for the probability density).

"Low-resolution grid" or "seismic resolution grid" or "lower resolution grid" means the primary grid of points used for the parameterization of the property fields.

"Model parameters" means the set of parameters resulting from the union of the property model parameters of the model properties.

"Model properties" or "modeled properties" means the set of properties that are jointly described as property fields and parameterized for prediction in an inference problem. In a preferred embodiment, the properties are mass density, compressional velocity (Vp), and shear velocity (Vs).

"Neural network method" means an inference method based on a network of non-linear multivariate operators (neurons), whose output to input signals are governed by a set of parameters (weights). The neural network (NN) is set to have experimental data (or variables derived from) as input and the model parameters (or variables derived from) as output. In a stage known as network training, the weights defining the behavior of all the neurons of the network are calibrated to perform an appropriate model parameter prediction from the observed data. This process requires a (large) number of input-output example collections (training population) that are used as training cases for the network. The background mathematical processes search the weights configuration that minimizes an objective function for the collection of training cases. Once trained, the observed data is applied to the network to predict the model parameters. Depending on the design of the network and pre-processing post-processing steps there are diverse types of neural networks; examples include the convolutional NN and the deep NN.

"Objective function" means a function of the model parameters that is the negative value of the logarithm of the posterior probability density. The posterior probability density is maximal where the objective function is minimal. The modes of the posterior probability density correspond to local minimums of the objective function.

"Optimization method" means an inference method consisting of the search of a model parameter configuration that minimizes (locally or globally) the objective function. The method starts with an initial model parameter configuration and calculates a model parameter update in the search of minimizing the objective function. The objective function is evaluated in the updated model, and the process repeats to approach in a sequence of steps to a minimum of the objective function. Examples of techniques used in optimization to minimize the objective function are the Gauss-Newton, Newton, gradient, conjugate gradient, L-BFGS, and simulated annealing methods.

"Posterior probability density" or "posterior density" or "posterior PDF" or "combined probability density" means the modeled probability of a configuration of the model parameters after taking into account the experimental observations.

"Prior probability density" or "prior density" or "prior PDF" or "prior probability" means the modeled probability of a configuration of the model parameters before taking into account the experimental observations.

"Property field" means a function that defines the value of a property at any point within a volume.

"Property model parameters" means a finite set of parameters that defines a property field according to a method to calculate the property value at any point of the volume from the parameter values.

"Property model parameterization" means the process involving the definition of the property model parameters and the method for calculating the value of the property field at any location. A common choice consists of defining a grid of points within the volume, defining the value of the property at the points in the grid as property model parameters, and defining an interpolation method to calculate the property at any point from the values of the property parameters at the neighbor grid points.

"Receiver" means a dispositive capable of recording the waves generated by medium perturbations in a specific location.

"Record data set" means data recorded by receivers as result of the medium response to the activation of sources.

"Recorded seismic data set" means data recorded by receivers as result of the medium response to the activation of seismic sources.

"Sampling method" means an inference method consisting of generating realizations of the model parameters with a frequency proportional to the posterior probability density. After a number of realizations, a collection or set of realizations is created. The sampling methods warrant that the statistics calculated from the collection of realizations converge to the statistics of the posterior probability density when the number of realizations increase. The statistics calculated from the collection of realization (e.g., centroids, standard deviations, covariances, histograms) are the solution to the inference problem. A family of techniques commonly used in sampling methods are Markov Chain Monte Carlo algorithms.

"Source" means a mechanism that perturbs the medium equilibrium in a location where it is activated. According to the medium dynamics, in the case of waves, the perturbation propagates through the medium.

"Target zone" means any sub-volume of the medium volume.

"Travel time" means the time lapse taken by a wave front to propagate from one point to another point.

"Uncertainty description" means providing a description of the dispersion of a variable from the expected value (e.g., standard deviations, covariances, deciles, centiles, a model for the probability density).

DETAILED DESCRIPTION

For a clear formulation of the method, consider that the survey acquired data from $N_{shot}$ punctual sources, in corresponding locations $s_i$, i=1, $N_{shot}$. Consider also that a number $N_{focus}$ of desired focus points has been defined with corresponding coordinate locations $f_j$, j=1, $N_{focus}$ within the surveyed earth volume; at least one focus point is required. The medium dynamics in the examples to be shown here correspond to an isotropic elastic model. The property fields in this case are the mass density and two elastic parameters. In a preferred embodiment, the mass density, the compressional velocity (Vp), and the shear velocity (Vs) are used as modeled properties; other combinations of elastic properties can also be implemented. The parametrization of the property fields is defined with the values of the property over a regular grid of points. The value of the property field in an arbitrary point of the medium is defined by an interpolation (kriging) from the values of the corresponding model parameters at the surrounding grid points. The array of model parameters that describe the configuration of the property fields are denoted here as, m.

The prior configuration of the modeled property fields is an initial one built with base on information (e.g., well information, geologic information, previous seismic studies, other geophysical survey analyses) that is already available before performing the full waveform seismic inversion. There are common methods for the construction of the prior model configuration (e.g., tomography, seismic processing velocities, well and horizon-based models, acoustic FWI, hybrid), which will not be described here. Denote as $m_{prior}$ the set of model parameters that describe the prior configuration of the property fields. As required in common FWI, the method makes use of a prior smooth seismic velocity field that should be conveniently close to the true model seismic velocities. The prior seismic velocity field is derived from the prior configuration of the property fields; in a preferred embodiment the velocity field is already one of the defined property fields of the model. In the examples, the FMS is elaborated for the P wave primary fields, thus requiring the P wave velocity field. In the case that S wave primary or converted front waves are used for the FMSs the S wave velocity field would be also required. In wave propagation the travel time between two points of the medium is the time lapse taken by the wave front to propagate from one point to the other.

The action of a wave source is commonly modeled with a source function $S(x, t)$, where x is the position in the volume and t the time dimension; the physical quantity represented by the function depends on the specific formulation and may be a scalar (e.g., pressure), a vector (e.g., body force) or a tensor (e.g., external stress). Denote as $S_i(x, t)$ the source function associated with the point source $s_i$. The FMS source function associated with the focal point $f_j$ is denoted as $F_j(x, t)$. The FMS source function is constructed by superposing the point sources $s_i$ with time delays $\Delta t_{ij}$ and amplitude weights $w_{ij}$ $$F_j(x,t)=\Sigma_i w_{ij} S_i(x,t-\Delta t_{ij}),$$

appropriately selected to focalize the wave intensity in the desired zone. For computational modeling the above operation is discretized over a space and time grid; spatial interpolation may be also a convenient strategy to increase the density of source points. Different approaches and FMS wave-front geometries can be used for the selection of time delays $\Delta t_{ij}$ and amplitude weights $w_{ij}$. Also, not all point sources need to be activated; for simplicity, the point sources that do not contribute to the FMS are given a zero amplitude-weight ($w_{ij}=0$).

In the expression above, the time delays $\Delta t_{ij}$ are the critical parameters to ensure the FMS focusing. The amplitude weights $w_{ij}$ can be considered optional and are used to improve the focusing quality and wave front uniformity. First, it is convenient to reduce the energy spreading at the borders of the wave front by reducing progressively to zero the amplitude weights of the point sources located near the emitted wave-front border. Second, the wave-front intensity near the focal point may not be homogenous with respect to the incidence and azimuth angles; the modeled amplitude calculated with the foci-source forward modeling can be used to equalize the intensity. Third, the source density per subtended ray angle is smaller in a near normal departure angle than in a large inclination departure angle if the point-source surface areal distribution is regular; source density irregularities can also be compensated by source amplitude weighting.

The invention includes any combination of time delays and amplitude weights that increase the cumulative energy received on a selected target zone of the volume by at least one FMSs. Two specific configurations of the time delays and weights are disclosed here: (1) convergent focused macro source (CFMS) and (2) beam focused macro source (BFMS). In the two configurations a calculation of the travel time $t_{ij}$ between the focal point $f_j$ and all point sources $s_i$ is used for the appropriate definition of the time delays $\Delta t_{ij}$ and optionally amplitude weights $w_{ij}$. There are various common methods to perform this travel time calculation (e.g., finite difference modeling, ray tracing) that can be used. A preferred embodiment uses the same seismic forward modeling routine to be used in the FWI dynamic modeling, placing a source in the focus location $f_j$ and detecting first arrivals at source locations $s_i$ using the prior model configuration $m_{prior}$ velocity model. Alternatively, the velocity model and foci-sources travel times $t_{ij}$ may be updated with the FWI estimation of the velocity as the FWI iterations proceed.

Figure 3:
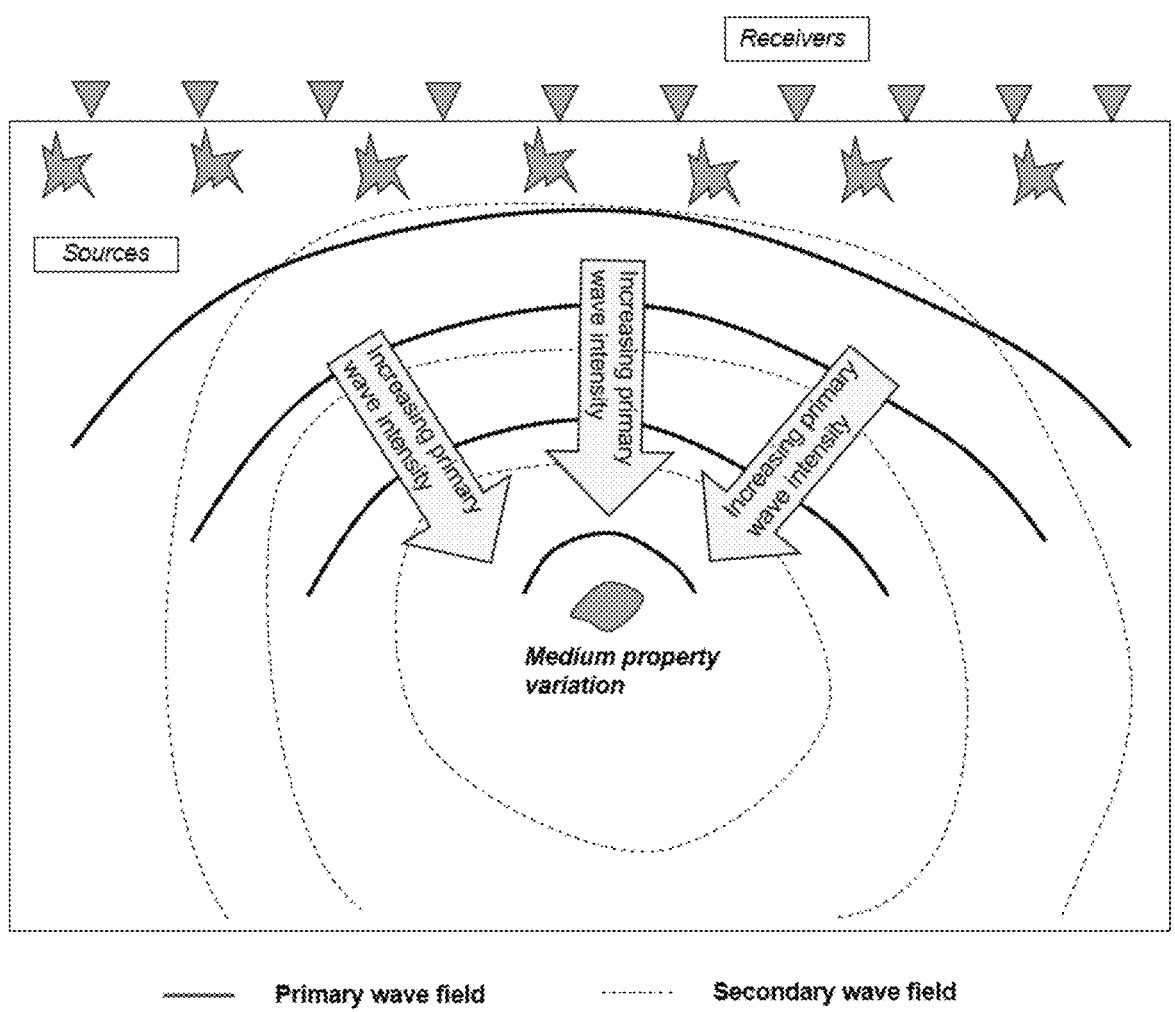
FIG. 3 shows the propagation phenomenon for waves emitted with a convergent focused macro source (CFMS) combining multiple point sources with appropriate time delays to focus the energy in a predefined target zone. The intensity of the CFMS emitted wave-fronts increase with the proximity to the focus point. Although the CFMS is not physically implemented in the field, the CFMS medium response at the receivers is synthetized in the computer from the field records of point-sources. The figure depicts a combination of point-sources activated with appropriate time delays and amplitude weights to focus the radiated energy in a given focus point, a primary wave-front propagating through the media converging towards the target zone with energy intensity increasing with the proximity to the focus point, property field heterogeneities within the target zone scatter the incident wave-fronts in all directions, and the medium response including upward scattered field (secondary field) is recorded in a series of points were receivers are placed.

A convergent focused macro source (CFMS) is designed to converge during propagation towards the focal point, as depicted in FIG. 3. The wave-front geometry is approximately a semi ellipsoid with the precise configuration depending on the velocity model. One way to calculate the time delays for the definition of the CFMS with focus point in $f_j$ is the following:

1. Using the prior model configuration $m_{prior}$, calculate travel times $t_{ij}$ from the focus location $f_j$ to each of the source points $s_i$.
2. Select the source with minimum travel time from the focus point $f_j$. Save this source index imin and the corresponding minimum travel time, $t_{imin\_j}$=Min [$t_{ij}$].
3. Calculate the time delays as, $\Delta t_{ij}=t_{imin\_j}-t_{ij}$. Notice that these time delays are negative, indicating that the source activation will be modeled with an anticipation time with respect to the zero time of the imin source.

Figure 4:
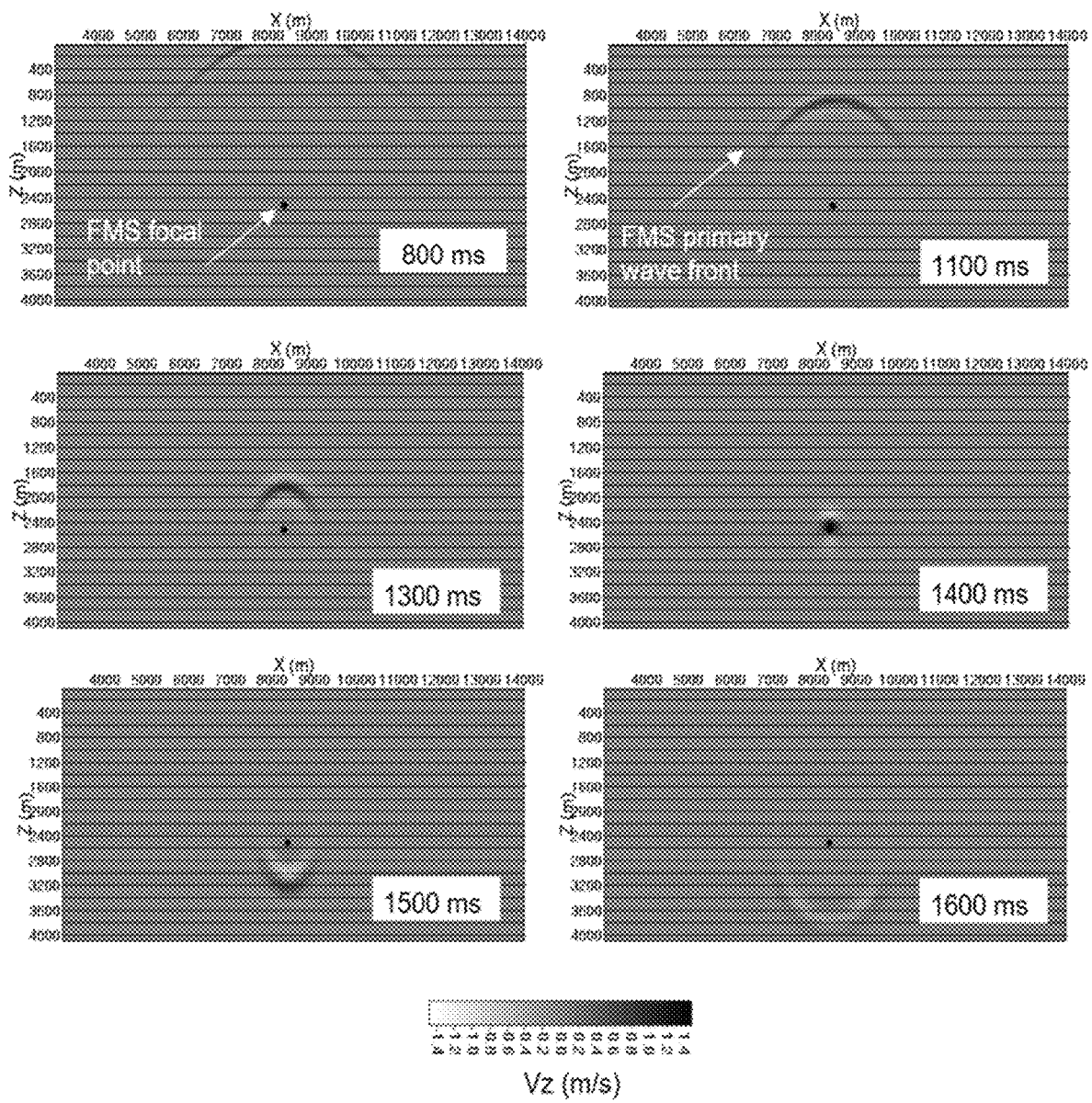
FIG. 4 illustrates the propagation of a convergent focused macro source (CFMS) generated primary wave front calculated by finite difference solution of the elasto-dynamic equations in a 2D model. The background isotropic elastic property fields are a smoothed and modified version of the Marmousi model (Versteeg, 1994). The CFMS array of point sources in this modeling example are near the surface with a separation of 20 m. The figure shows the focal point used for designing the CFMS and the plots indicate the vertical component of the medium velocity at different times from the activation of the CFMS; the time zero corresponds to the activation time of the first activated point-source in the CFMS source array. The shape of the wave front approximates a semi-ellipse that progressively converges towards the focal point, which is reached by the primary front at around 1400 ms. The amplitude and intensity of the CFMS front increases with the proximity to the selected focus point.

FIG. 4 shows a finite difference modeling of a focused macro source in a smoothed heterogeneous elastic 2D medium, obtained as a modification of the Marmousi (Versteeg, 1994) model, commonly used for FWI tests. Snapshots at various propagation times are shown depicting the convergence of the wave front to the FMS focal point where the transmitted energy concentrates at around 1400 ms time. The modeled multiple point sources in this figure are located at 40 m meters beneath the upper model surface with 20 m horizontal spacing between them. The shape of the primary convergent front is a pseudo semi-ellipse (a semi-ellipsoid in 3D) with amplitudes decreasing at the lateral extremes for adequate focusing and reduction of the border energy spreading. For this seismic modeling, the amplitude weights $w_i$ have been set to the square of the sin function of the inclination angle of the source-focus transect. With this setting, the source's weighted amplitudes reduce from a maximum at sources above the focus to a minimum at the extremes of the source array, compensating the larger source density per focus point subtended inclination angle.

As described above, $\Delta t_{ij}$ warrant the simultaneous arrival to the focus of the primary field emitted by each point source, whereas the source amplitude weights $w_{ij}$ can be set to improve the focusing quality and wave front uniformity depending on the spatial distribution of the point sources. In a common case (e.g., seismic survey in FIG. 4), the source points are constrained to the medium upper surface. In addition, point sources may be irregularly distributed in ray azimuth and inclination arrival angles to the focal point. In the disclosed method source weights $w_i$ are adjusted to avoid energy spreading in the equatorial border of the semi elliptical front and regularize the solid angle incident energy intensity. Using uniform weights $w_{ij}=1$ is a particular option, however not optimal in focusing the energy as produces important spreading at the extremes of the focused front. Different calculations can be employed for setting appropriate weights $w_{ij}$ according to the mentioned goals, accounting for the specific source point spatial distribution, radiation pattern and wave-front propagation. Another implemented embodiment also includes the calculated foci-source amplitude for the computation of the amplitude weights.

Figure 5:
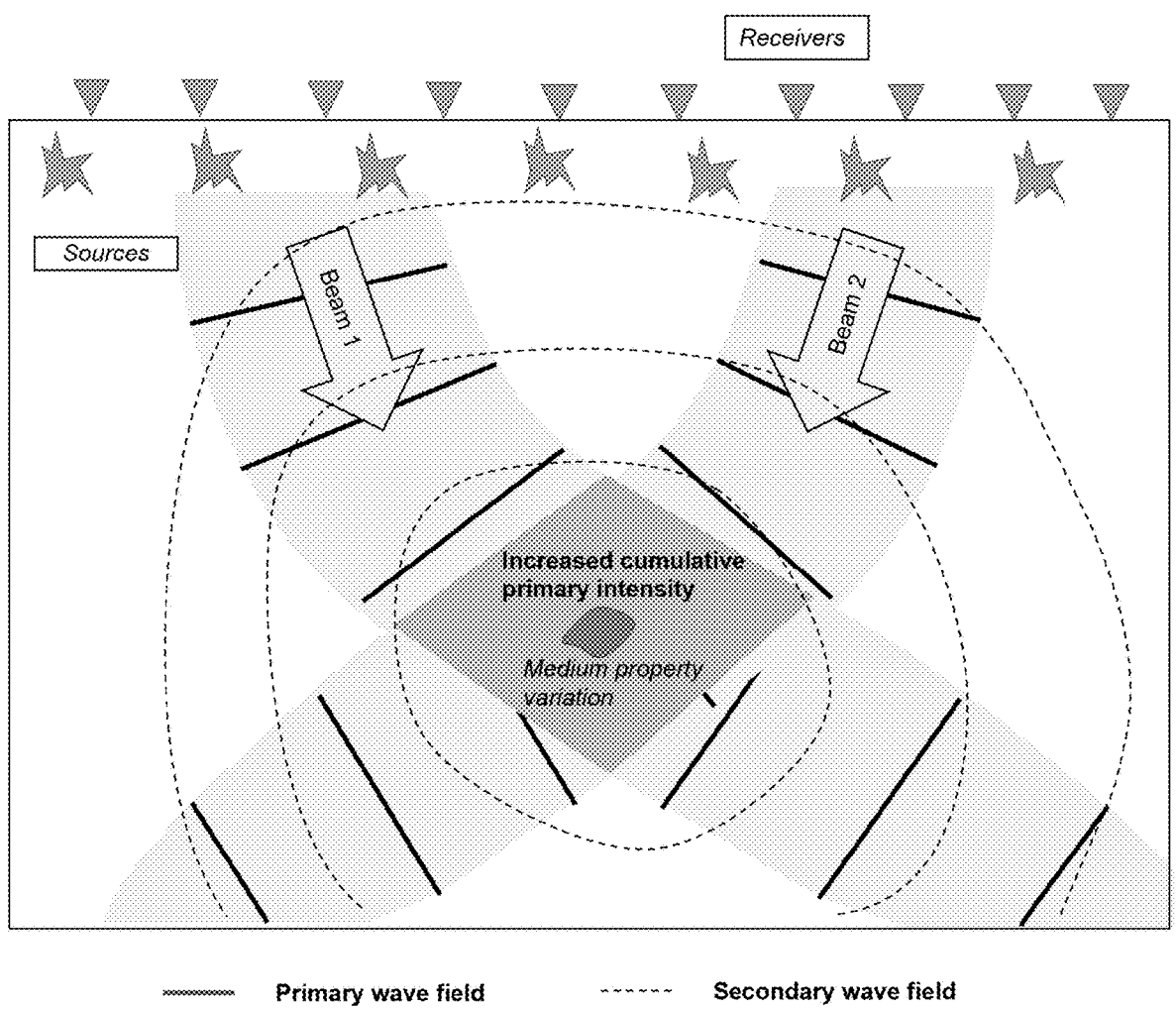
FIG. 5 illustrates the propagation of waves emitted with two beam focused macro sources (BFMSs) combining multiple point sources with appropriate time delays to direct the energy to a predefined target zone. Each beam has a predefined section area, has an incidence direction, and is characterized by a pseudo-planar wave-front, thus approximately preserving the primary wave-front intensity as the front propagates. The two beams have different arrival directions to a common target point. The beam paths are shown in light gray, and the zone where the two beams intercept is shown in dark gray; the two beams have different arrival directions to a common target point. The interception zone receives increased cumulative energy, compared with surrounding zones, in proportion to the number of beams and variety of the arrival direction. In consequence, heterogeneities in the interception zone radiate increased cumulative secondary wave field energy to the receivers and the model parameters in the target zone have larger data sensitivity. Although the BFMSs are not physically implemented in the field, the BFMS medium response at the receivers is synthetized in the computer from the field records of point sources. The figure depicts the two beams primary wave-front propagating through the media directed towards the target zone with approximately uniform beam cross-section and wave intensity, property field heterogeneities within the target zone scatter the incident wave-fronts in all directions, and the medium response including upward scattered field (secondary field) is recorded in a series of points where receivers are located.

For the beam focused macro source (BFMS) scenario, the energy focusing is not achieved per macro source but jointly by the cumulative effect of two or more BFMSs. Each BFMS wave-front is designed to have a defined frontal area (or frontal longitude in 2D) and a direction of incidence to the focal point. The wave-front of the beam is approximately planar in order to keep the wave intensity approximately uniform while propagating through the medium. The direction of incidence will be described here by the unitary director vector of the plane at the focal point $k=(k_x, k_y, k_z)$ pointing in the direction of the wave propagation; components of the director vector are straight forwardly calculated from other parameters such as inclination and azimuth angles. The beam is also characterized by an approximate prescribed area of the wave-front that will be parameterized here by a radius R from the center of the beam. By using more than one BFMSs from a different direction (different incidence angle to the focus) in the FWI, the cumulative energy arriving to the focal zone is larger than the cumulative energy arriving to surrounding zones. This scenario is depicted in FIG. 5. The figure shows two beams with the same target point and different incidence directions. The set of BFMSs does not need to be modeled jointly, as the cumulative energy used in the FWI estimation is the relevant factor for an increased data sensitivity of the target zone. The BFMSs are modeled separately in a preferred embodiment illustrated in this document. However, the BFMSs can be also modeled in a single forward run with a sequence separated by time delays, or using other superposition strategies.

The way to calculate the time delays for the definition of the BFMS with focus point in $f_j$ and incident direction $k_j$ requires the identification of the surface projection of the beam, where the corresponding source points will be activated in the BFMS. The calculation involves the combination of two types of travel times: (1) the focus-source travel times as for the CFMS and (2) plane wave-front travel-times. The resulting time delays are calculated as follows:
 1. Using the prior model configuration $m_{prior}$, calculate travel times $t_{ij}$ from the focus location $f_j$ to each of the source points $s_i$.
 2. Select an arbitrary reference source location (e.g., $s_1$) and calculate plane wave-front time delays $h_{ij}=(k_j \cdot (s_i - s_1))/v_j$, where the dot symbol (·) indicates the scalar product between the two vectors and $v_j$ is the seismic wave velocity at the focal location $f_j$ given by the prior model $m_{prior}$.
 3. Add the focus-source travel times and the plane front travel delays for a total travel time $q_{ij}=t_{ij}+h_{ij}$.
 4. Select the source with minimum total travel time from the focus points $f_j$. Save this source index imin and the corresponding minimum travel time, $q_{imin\ j}=\text{Min}\ [q_{ij}]$. This source location, $s_{imin}$ is the central source for the BFMS.
 5. Calculate the final time delays as, $\Delta t_{ij}=h_{imin\ j}-h_{ij}$. A positive value for $\Delta t_{ij}$ indicates delay with respect to the beam central point-source zero time, and a negative value indicates anticipation.

Figure 6:
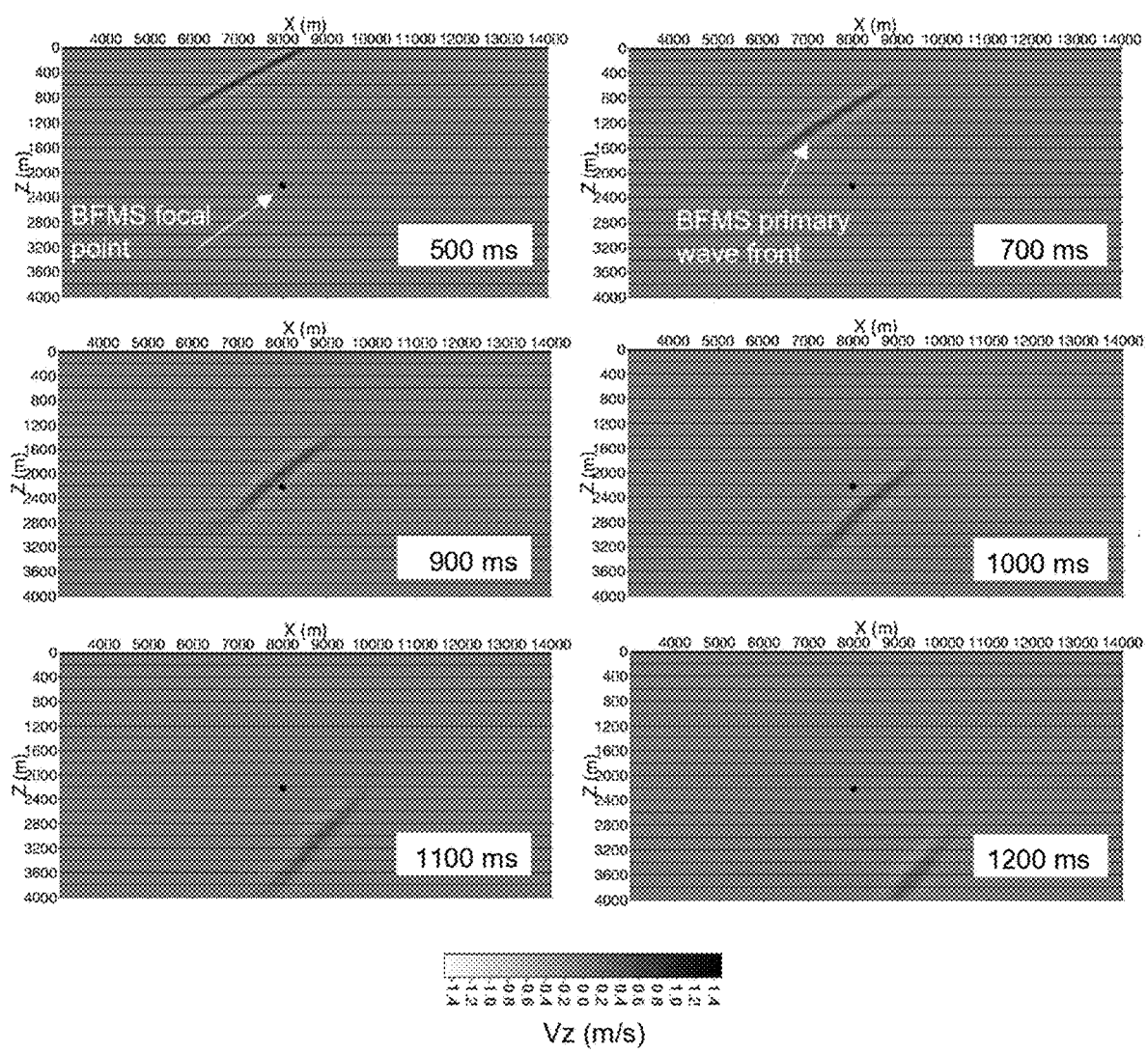
FIG. 6 illustrates the propagation of a beam focused macro source (BFMS) generated primary wave front calculated by finite difference solution of the elasto-dynamic equations in a 2D model. The background isotropic elastic property fields are a smoothed and modified version of the Marmousi model (Versteeg, 1994). The BFMS array of point sources in this modeling example are near the surface with a separation of 20 m. The figure shows the focal point used for designing the BFMS and the plots indicate the vertical component of the medium velocity at different times from the activation of the BFMS; the time zero corresponds to the activation time of the first activated point-source in the BFMS source array. The shape of the wave front approximates a plane segment of 3 km length that propagates towards the focal point, which is reached by the primary front short after 900 ms. The amplitude and intensity of the BFMS front is approximately preserved while propagating in direction to the selected focal point.

FIG. 6 shows a finite difference modeling of a single BFMS in a smoothed heterogeneous elastic 2D medium, obtained as a modification of the Marmousi (Versteeg, 1994) model, commonly used for FWI tests. Snapshots at various propagation times are shown depicting the propagation of the beam wave-front to the BFMS target point where the radiated energy arrives short after 900 ms. The modeled multiple point sources in this figure are located at 40 m meters beneath the upper model surface with 20 m horizontal spacing between them. The shape of the primary front is a pseudo plane with amplitudes being approximately uniform in most of the wave-front and decreasing at the lateral extremes for adequate focusing and reduction of the border energy spreading. For this seismic modeling, the amplitude weights $w_i$ have been set uniformly to one in most of the beam active sources and linearly approaching to zero in the sources projected at the extremes of the beam wave-front.

The time delays $\Delta t_{ij}$, described above, warrant the pseudo-planar geometry of the wave-front and the prescribed direction arrival to the target point, whereas the source amplitude weights $w_{ij}$ define the width of the beam and the corresponding selection of the point sources that contribute to the BFMS; the weights $w_{ij}$ are zero for the sources not contributing with the beam. To select the active beam point sources for a BFMS, a distance of every source $s_i$ is calculated with respect to the central beam source, $s_{imin}$. This distance is calculated with the projection of the point sources on the plane wave-front, centered at the beam central point source. The direction of the plane at the beam central point source is appropriately projected from the incidence direction at the target point by ray parameter conservation (Snell's law). In step 2 of the computations enumerated above, the plane wave delay times are calculated using the common approximation of a uniform velocity near the wave-front; more precise methods can also be used.

The description that follows is valid for FMSs of convergent, beam or other designs, whether they focus the cumulative energy individually per FMS or jointly with other FMSs; the specific design will be noted only when necessary. Depending on the size of the seismic surveyed area, the recording time, size of the target zone and source-receiver aperture, not all point sources employed in the survey need to be included in the focused macro source. When a source location is too far from the focus point, the addition of the source-focus travel time and the travel time of the energy scattered back to the surface, may be larger than the total recording time. Hence, the focus scattered energy would have not been recorded. In a preferred embodiment, only the sources with a source-focus travel-time smaller than a selected upper bound are retained within the FMS. A reference value for the upper bound travel time is half of the total receiver recording time per shot, but the value could be adjusted according to the case.

Figure 7:
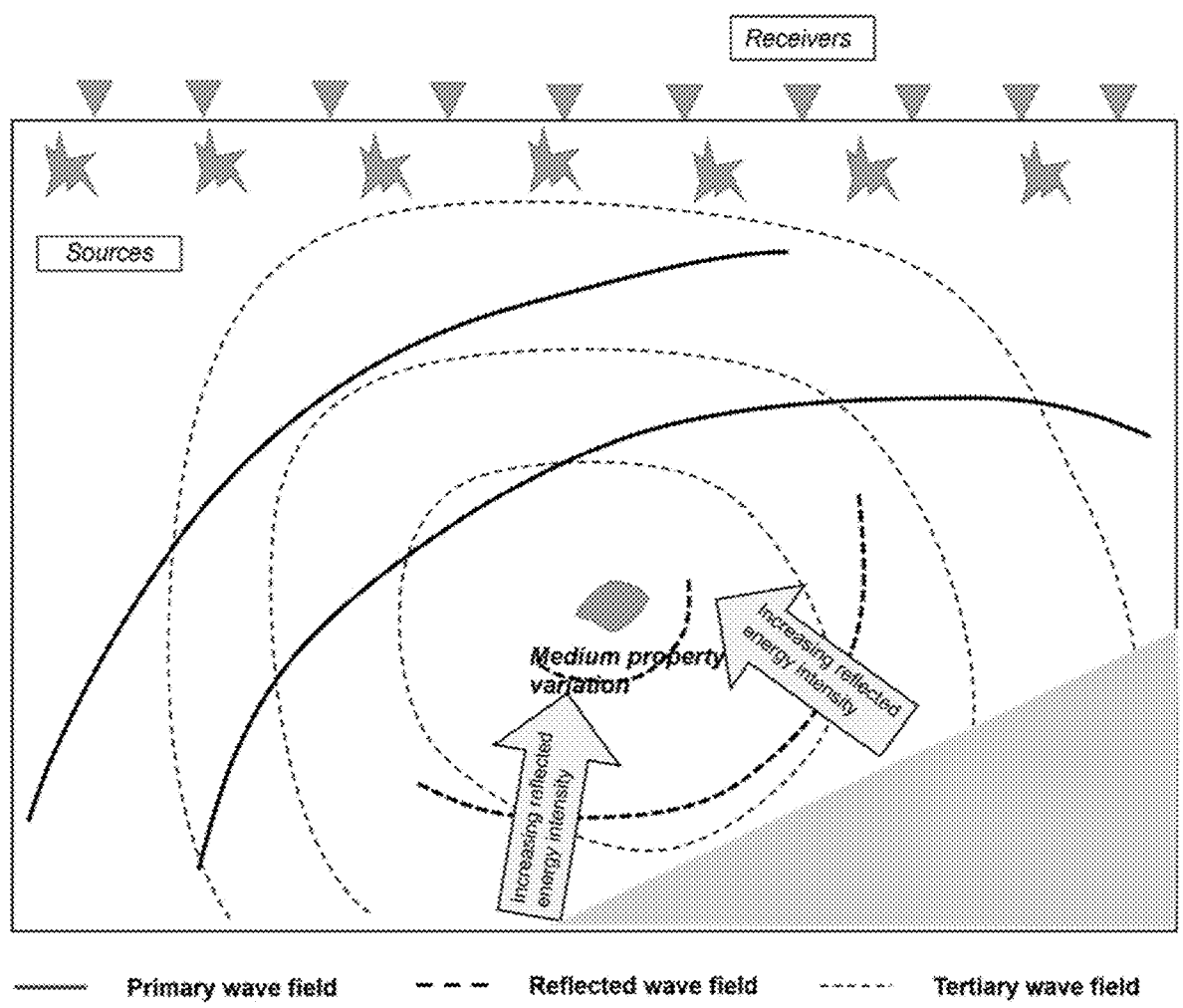
FIG. 7 shows the propagation phenomenon for waves emitted with a convergent focused macro source (CFMS) combining multiple point sources with appropriate time delays to focus the energy in a predefined target zone, after a reflection in a known strongly reflecting interface. The energy intensity of the CFMS reflected wave-fronts increase with the proximity to the focus point. Although the CFMS is not physically implemented in the field, the CFMS medium response at the receivers is synthetized in the computer from the field records of point-sources. The figure depicts a combination of point-sources activated with appropriate time delays to focus the radiated energy in a given focus point after a reflection, a primary wave-front propagating through the media converging towards the reflecting interface, reflected wave-fronts converging towards the target zone with intensity increasing with the proximity to the focus point, property field heterogeneities within the target zone scatter the incident wave-fronts in all directions, and the medium response including upward scattered field (tertiary wave field) is recorded in a series of points were receivers are placed.

The primary energy emitted by the source is not only useful for the illumination of the target zone. In some cases, the reflections of the primary front from surfaces of strong property contrasts produce secondary fronts (or higher order multiple reflections) with relevant contribution in the illumination of the target zone. Examples are the reflections at the free earth surface, sea bottom or strong reflectivity sedimentary strata. In this cases, appropriate time delays may be designed adding up the primary arrival time delay from the point-source to the reflecting surface, and the secondary time delay (or multiple reflections time delays) between the reflecting surface and the desired focus point. FIG. 7 illustrates this scenario with the example of a CFMS. Reflection focused macro sources, designed to include intermediate strong reflections before reaching the target zone, can be also designed and included in the FMS set.

Depending on the wave phenomenon, a point-source may emit various types of waves (phases), or alternatively different types of wave sources can be employed. The focusing method described here is not restricted to a specific type of wave, and can be equally applied to focus any of the phases generated at the desired focal point. As example, in the case of the propagation of motion waves in isotropic elastic medium, compressional body waves, shear body waves and various types of surface waves are generated. In seismic applications for reservoir description, the information provided by the emitted compressional wave (P-wave) is the most commonly used, but also the information from shear waves (S-waves) has been used in applications, or a combination of them. Shear waves are commonly produced as a secondary front when a compressional point-source is reflected with the free solid earth surface. Also, sources of shear waves have been designed. The FMS described above, can be calculated to focus the energy of any of these phases, or their conversions, by accounting the appropriate travel time delays.

Consider having a number of receivers in the survey $N_{receiver}$ with coordinate locations $r_k$, $k=1$, $N_{receiver}$. For each source $s_i$ fired, the survey provides seismic observed records $d_i^{obs}(r, t)$ where r are receiver locations and t reflection time; the function is defined over the discrete space of receiver locations and sampled times. Commonly, each of the records $d_i^{obs}(r_k, t)$ corresponds to a large number of samples taken at regular time intervals, $m=1$, $N_{samples}$, during a time observation lapse (typically several seconds) starting at the moment the source is activated. These set of samples, for a given source and receiver, is known in geophysical jargon as the seismic trace.

For a focused macro source (FMS), with focus point $f_j$, all (or a subset) of the point sources of the survey are combined with appropriate times delays to focus the energy in the selected focus point. Using the wave superposition principle, the seismic response of the combination of these sources can be predicted, by adding up the receiver responses after applying to the recorded data the same time delays $\Delta t_{ij}$ and amplitude weights $w_{ij}$ corresponding to the point-sources included in the FMS. This principle allows constructing for each receiver $r_k$ the seismic response (seismic trace) that would be recorded should the FMS with focus location $f_j$ be fired in the field. Denote this seismic record $d_j^{fms}(r, t)$ and refer to it as the FMS observed gather, it is constructed as, $$d_j^{fms}(r,t)=\Sigma_i w_{ij} d_i^{obs}(r_k, t-\Delta t_{ij}).$$

As the observed data and computed data is discretized, the calculation above involves a time resampling of the observed data to the common time grid of the FMS observed gather for the addition. The above formulation is equally valid for the CFMS, BFMS or other FMS observed gathers.

Depending on the survey design, not all receivers record data from all point sources. However, the receiver-source separation for an active recording is commonly designed according to the target depth to sufficiently encompass the medium response of the target zone. Under this assumption, the observed data for the non-activated receivers can be approximated to zero. Another approach is to only include a subset of the survey receivers in the FMS observed gathers, depending on the size of the seismic surveyed area, the recording time, size of the target zone and source-receiver aperture. If a receiver is too far from the focus point it may be that the time arrival of the energy scattered around the focus point arrives to the receiver later than the total recording time. Also, in some survey arrangements only the receivers within a given range from the point-source are activated. A criterion to include receivers in the FMS gather can be made with reference to the fraction of active recordings of the set of sources included in the FMS. A lower limit can be established to exclude from the FMS observed gather receivers that have recorded data from a low percentage of the sources included in the FMS; other approaches can be used to address this practical issue.

Another aspect of the invention consists of using a double scale for the model description of the property fields. One scale corresponds to a gridding commensurate with the spatial resolution (low resolution) of the properties according to the seismic dominant wavelengths. This is the primary scale and it is used for the prior model configuration $m_{prior}$ and for the estimated or sampled model configurations $m_n$, where the index n represents the iteration (in case of an iterative optimization method) or sample (in case of a sampling method). However, the numerical seismic modelling may require a higher resolution spatial scale (smaller grid point distances). Denote the model parameters in this higher resolution grid as $m_{prior}^{hires}$ for the prior model and $m_n^{hires}$ for iteratively updated models or samples. The hi-resolution model scale is linked to the primary resolution scale by an interpolation transform $m^{hires}=T\,m$. Many interpolation methods can be used; in a preferred embodiment a kriging method is used for the interpolation transform. The use of the double scale is optional to this method. Using a single scale for seismic modeling and parameter estimation is a particular case of the transform, by using a transform identity matrix, $T=I$. In an embodiment, the scale transformation involves a spatial covariance matrix that can be based in characterized geostatistics of the area. The anisotropic axis of covariance in one embodiment is also oriented according the seismic characterized stratigraphy.

The procedure above describes how to construct the FMS observed gather $d_j^{fms}(r, t)$ from the original observed seismic data. Given a particular model configuration, $m_n$, of the property fields the FMS calculated gather $d_j^{calc}(r, t)$ with focus point $f_j$ is obtained by solving the forward wave propagation problem with the corresponding FMS (i.e., multiple point-sources activated following the indicated time delays). There are many methods that can be used in the dynamic modeling of the wave propagation phenomenon (e.g., finite-differences, finite-elements, spectral elements). The present disclosed approach can be applied with any of them; in a preferred embodiment, an explicit finite-difference method in time domain is used. At the locations of the receivers the numerically modeled data $d_j^{calc}(r, t)$, is saved. There are no time shifts or resampling to be applied to the FMS calculated gather as the delays and amplitude weights have been already applied to the source functions.

Once the preparation of the FMS and FMS observed gathers is completed, the sequence of the FWI procedure follows as usual. The complete sequence for the case of an iterative optimization procedure of the FWI is summarized as follows:

1. Adopt a pertinent parameterization of the medium property fields. In a preferred embodiment, the medium properties pertinent to the surveyed wave phenomenon are described over a regular 3-dimensional grid encompassing the earth volume under exploration.
2. Define a prior background model $m_{prior}$ useful for the calculations of travel times. In a preferred embodiment this model is also used for the iteration zero seismic modeling and as prior information in the objective function.
3. Define the target zone for the localized FWI and distribute at least one FMS focus points $f_j$ within the target zone.
4. Calculate travel times from each focus point $f_j$ to each survey source location, $s_i$, and calculate the corresponding source time delays $\Delta t_{ij}$ for appropriate focusing to each focus point.
5. Apply delays, source weights and resampling to calculate the FMS observed gathers $d_j^{fms}(r, t)$ for all FMS sources.
6. Adopt the prior model as initial model configuration $m_n=m_{prior}$ with $n=0$.

7. Interpolate the model configuration to hi-resolution scale $m_n^{hires} = T\, m_n$.
8. Numerically model the seismic response of the model configuration to obtain the FMS calculated gathers $d_j^{calc}(r, t)$.
9. Compare the observed and calculated FMS gathers and apply a procedure to estimate a model update, $\Delta m$, for data fit improvement. Apply the model update, $m_{n+1} = m_n + \Delta m$.
10. Make $n=n+1$ and repeat steps 7, 8, 9, and 10 until data convergence is achieved.

Figure 8:
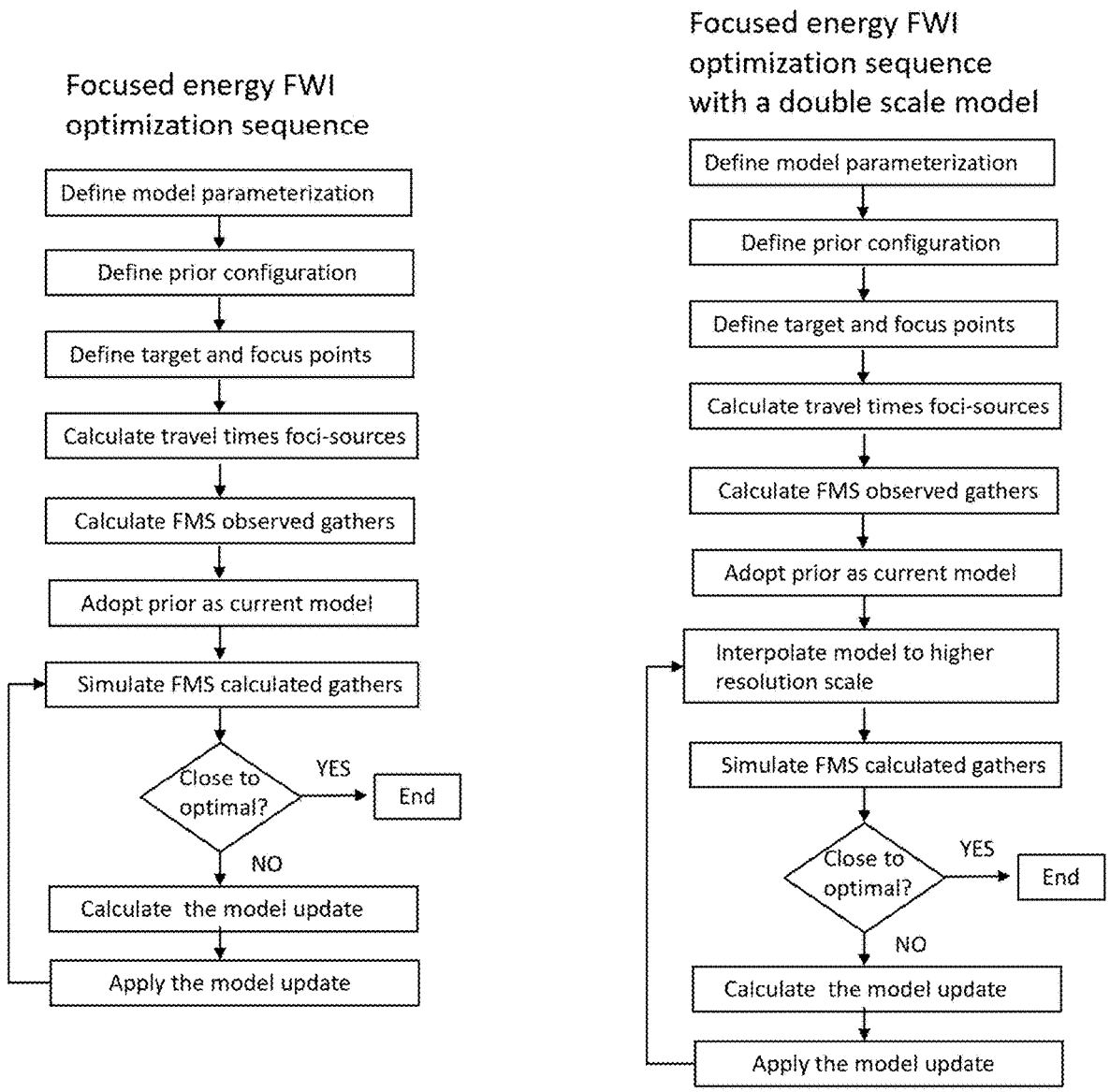
FIG. 8 shows preferred workflows for the focused macro source (FMS) full waveform inversion procedure disclosed herein following an iterative optimization approach (FIG. 8A) and an iterative optimization approach including a double scale model with a transform from the lower to the higher resolution scale (FIG. 8B).

This sequence is depicted in FIG. 8A for a single scale property model embodiment, and FIG. 8B for a preferred embodiment using a double scale model with a transformation between the two scales.

For clarity in the notation, define the trace FMS observed array $$d_{kj}^{fms} = (d_j^{fms}(r_k, t_m);\ m=1, \ldots, N_{samples}).$$

and the trace FMS calculated array as $$d_{kj}^{calc} = (d_j^{calc}(r_k, t_m);\ m=1, \ldots, N_{samples})$$

where m denotes the time discrete sampling index. There are many approaches for the estimation of the model update that can be used (step 9 above). In most of them, the iterative procedure searches to minimize an objective function. In a preferred embodiment, the objective function with a data term and a prior information term is defined as $$S = \tfrac{1}{2}\Sigma_{kj}(d_{kj}^{calc} - d_{kj}^{fms})^T C_d^{-1} (d_{kj}^{calc} - d_{kj}^{fms}) + \tfrac{1}{2}(m - m_{prior})^T C_m^{-1}(m - m_{prior}).$$

Above, $C_m$ is the model covariance matrix and $C_d$ is the data covariance matrix. Other objective functions can be used, which may include additional terms or exclude the prior information term. A core step in the FWI methods is the estimation of the model update $\Delta m$ in step 9 above. In a preferred embodiment, the gradient of the objective function is calculated by the common approach of the adjoint operator (i.e., propagating the residuals backward in time and correlating with the forward time propagation) and use the limited memory Broyden, Fletcher, Goldfarb, and Shanno (L-BFGS) method (Liu and Nocedal, 1989; Nocedal and Wright, 2006; Monteiller et al., 2015) to iteratively obtain model updates with approximative second order information. In another embodiment, the objective function's Jacobian is calculated on the grid points within the target zone (low resolution scale) and the pseudo-Hessian matrix of the objective function is constructed to use a Gauss-Newton method for the model updates.

Although the main goal of the optimization method is to search for the model parameter configuration that minimizes the objective function, a calculation of the uncertainty around the estimated model configuration can be also performed. An approximation to the posterior covariance matrix is the inverse Hessian matrix of the objective function; in particular the standard deviations of the model parameters are the square root of the diagonal elements of the inverse Hessian matrix. Approximations to the Hessian matrix can be obtained with different approaches both with the method based on the numerical calculation of the Jacobian, as in the adjoint operator method. In addition, sampling around the estimated model configuration can be also used for a description of the local posterior uncertainty.

Figure 9:
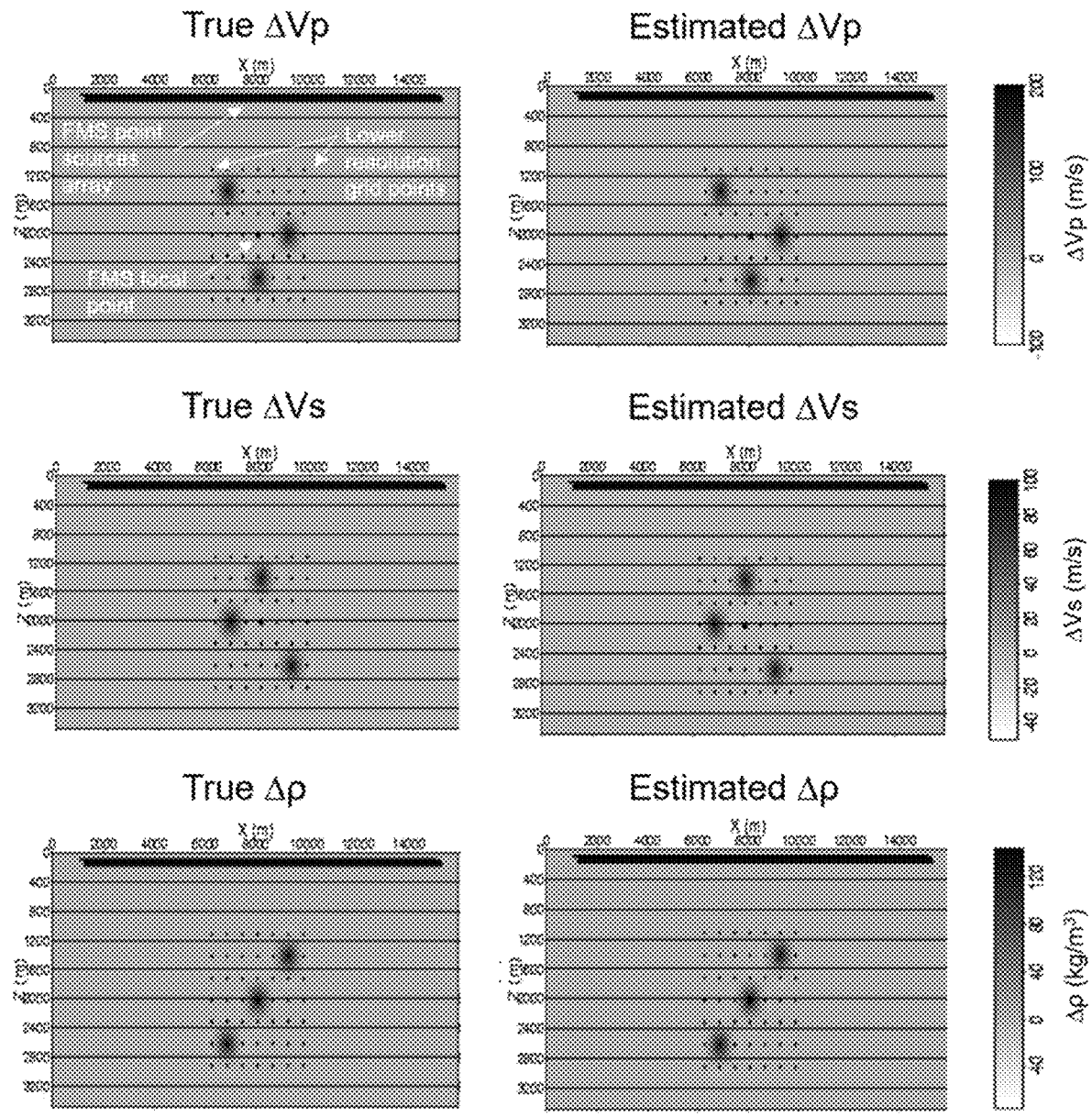
FIG. 9 shows a check board sensitivity tests for the joint resolution of Vp, Vs and mass density increments in a target region surrounding the focal point of a single CFMS source. The background prior property fields are a smoothed modified version of the Marmousi model. The true model consists of the joint addition of increments of Vp, Vs and mass density at 9 selected locations on the low (seismic) resolution grid (3 locations per property). The plots show the increment of the properties in reference to the background prior model, a set of low-resolution grid points (small black dots) within the target zone, the focal point (large black dots) and the array of point sources used in the CFMS near the surface. The vertical axis indicates depth and the horizontal axis is horizontal distance in the 2D section. The true property increments (left-hand column plots) and the estimated property increments (right-hand column plots) are very close, almost indistinguishable from the plots. Only one CFMS was used in this test, and the estimations shown correspond to the third iteration in one of the embodiments presented: an algorithm based on the explicit Jacobian computation, pseudo-Hessian calculation and Gauss-Newton method.

FIG. 9 shows a check board test for the joint resolution of Vp, Vs, and mass density increments in an isotropic elastic heterogeneous medium modified from the Marmousi test model. The line of sources and receivers is close to the surface and increments from the prior model at the seismic scale are shown at different locations for Vp, Vs and mass density. The increments of the three mentioned properties are jointly present in the model and jointly solved by our FWI algorithm. The left-hand side column of the figure shows the true model increments and the right-hand side column of the figure shows the estimated increments. The inversion used a single convergent focused macro source with focus at the center of the check board test and only three iterations of the optimization algorithm were required to sufficiently converge to the true solution. In this case, the inversion method corresponds to the explicit numerical calculation of the Jacobian to construct the pseudo-Hessian and minimize the objective function with a Gauss-Newton method. The estimated increments are very close to the true increments and cannot be distinguished from the plots view.

Figure 10:
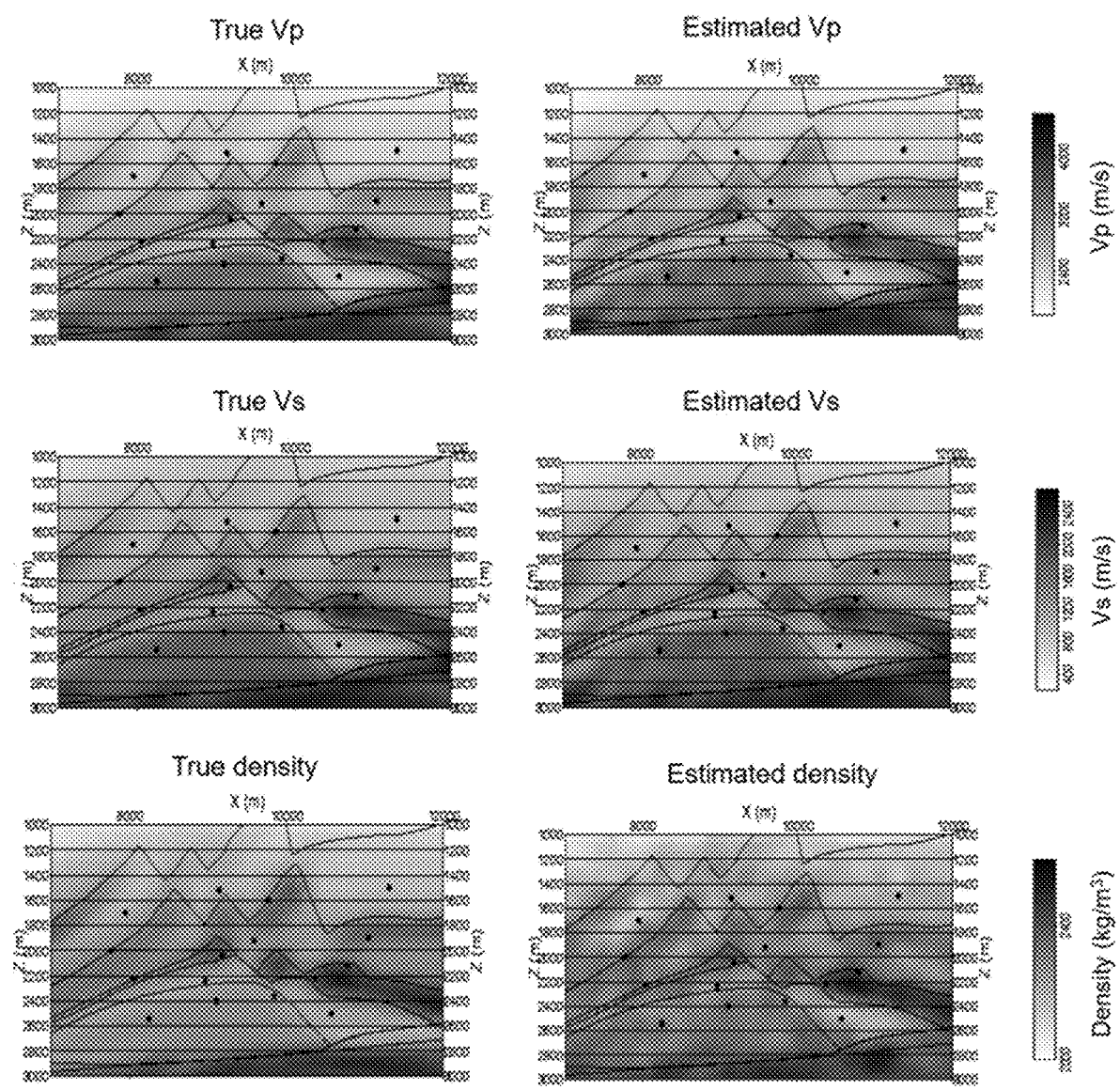
FIG. 10 shows a synthetic test of the joint estimation of the property fields of compressional seismic velocity (Vp), shear seismic velocity (Vs) and mass density obtained from the convergent focused macro source (CFMS) full waveform inversion method implemented with 16 focal points. The focal points (black dots) have been distributed pseudo-randomly within the target zone. The inversion method used in this case corresponds to an algorithm using the L-BFGS model update with computation of the gradient of the objective function with the adjoint method (reverse propagation of residuals and correlation with the primary field). The plots correspond to a zoom into the target zone within a larger model obtained as a modified version of the Marmousi model. The estimated property configurations (right-hand side column plots) reproduce the true model property configuration (left-hand side column plots). The black curves show model horizons plotted for visual comparison of the images.

FIG. 10 shows a zoom into a 2D target zone within a larger 2D model modified from the Marmousi test model. The figure shows the pseudo-random location of 16 focal points corresponding to 16 CFMSs used in this inversion test. The true property Vp, Vs, and mass density fields are shown in the left-hand column whereas the estimated Vp, Vs, and mass density fields are shown in the right-hand column. Lines showing interpreted strata are superposed to all plots for comparison but do not play a role in the FWI or modeled covariances in the results shown. The estimated results show resolution of the true property field features in the target area. In this case, the FWI method employed is a gradient based L-BFGS using the adjoint approach (backward residual propagation) for the calculation of the gradient.

Figure 11:
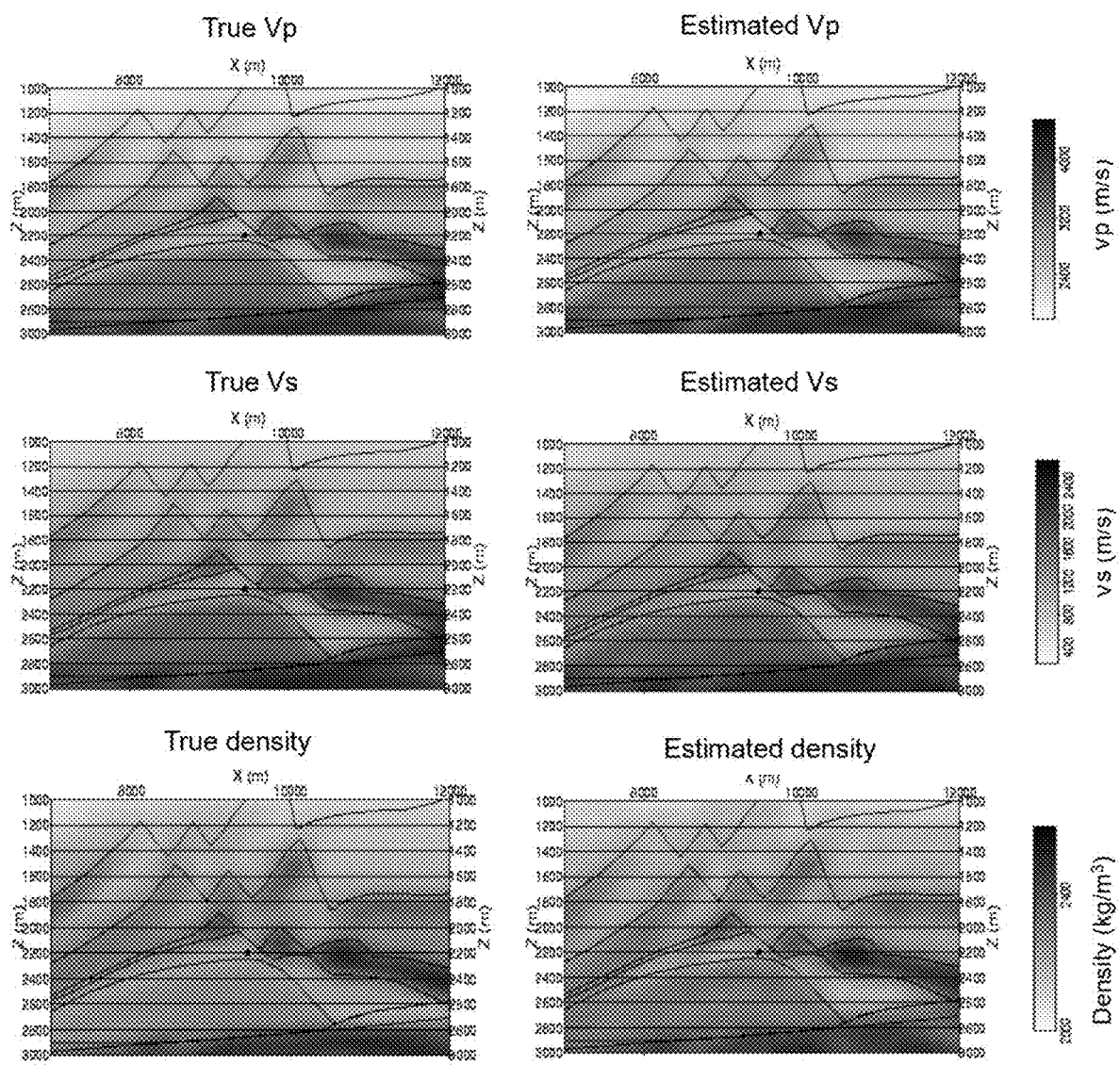
FIG. 11 shows a synthetic test of the joint estimation of the property fields of compressional seismic velocity (Vp), shear seismic velocity (Vs) and mass density obtained from the beam focused macro source (BFMS) full waveform inversion method implemented with 15 BFMSs beams. The beams have a common target point (black dot), approximately 3 km section length and incident angles at the target point in the range of −35° to 35° measured from the vertical axis. The inversion method used in this case corresponds to an algorithm using the L-BFGS model update with computation of the gradient of the objective function with the adjoint method (reverse propagation of residuals and correlation with the primary field). The plots correspond to a zoom into the target zone within a larger model obtained as a modified version of the Marmousi model. The estimated property configurations (right column plots) reproduce the true model property configuration (left column plots). The black curves show model horizons plotted for visual comparison of the images.

FIG. 11 shows a zoom into a 2D target zone within a larger 2D model modified from the Marmousi test model. The figure shows the focal point for a set of 15 BFMS with beams of 3 km section length with inclination angles at the focal point range from −35° to 35°. The true property Vp, Vs, and mass density fields are shown in the left column whereas the estimated Vp, Vs, and mass density fields are shown in the right column. Lines showing interpreted strata are superposed to all plots for comparison but do not play a role in the FWI or modeled covariances in the results shown. The estimated results show resolution of the true property field features in the target area. In this case, the FWI method employed is a gradient based L-BFGS using the adjoint approach (backward residual propagation) for the calculation of the gradient.

As alternatives to the optimization approach, other FWI approaches can be used in the scope of the present invention. As mentioned before, the invention refers to the elaboration of synthetic FMS and the corresponding FMS observed gathers for input to the full waveform inversion solver. Hence, it can be used in combination to any FWI solution approach. If a sampling approach, like Markov Chain Monte Carlo is used, instead of an iterative optimization one, the posterior probability density function (PDF) should be defined $$\sigma(m) = c\rho(m)L(m).$$

Above, c is a normalization constant, $\rho(m)$ is the prior PDF and $L(m)$ is the likelihood function. In a preferred embodiment, the prior PDF is defined with a multivariate Gaussian model with centroid in the prior model $m_{prior}$ $$\rho(m) \propto \mathrm{Exp}[\tfrac{1}{2}(m - m_{prior})^T C_m^{-1}(m - m_{prior})],$$

and the data likelihood assuming multivariate Gaussian data uncertainties $$L(m) = \mathrm{Exp}[\tfrac{1}{2}\Sigma_{kj}(d_{kj}^{calc} - d_{kj}^{fms})^T C_d^{-1}(d_{kj}^{calc} - d_{kj}^{fms})].$$

The sequence for the energy focused method of FWI with a sampling approach is the following:
1. Adopt a pertinent parameterization of the medium property fields. In a preferred embodiment, the property fields pertinent to the surveyed wave phenomenon are described over a regular 3-dimensional grid encompassing the earth volume under exploration.
2. Define a prior background property field $m_{prior}$ useful for the calculations of travel times. In the preferred embodiment this model is also used for the iteration zero seismic modeling and as prior information in the objective function.
3. Define the target zone for the localized FWI and distribute at least one FMS focus points $f_j$ within the target zone.
4. Calculate travel times from each focus point $f_j$ to each survey source location $s_i$ and calculate the corresponding source time delays $\Delta t_{ij}$ for appropriate focusing to each focus point.
5. Apply delays, source weights and resampling to calculate the FMS observed gathers $d_{kj}^{fms}$ for all FMS sources.
6. Adopt the prior model as initial model configuration $m_0 = m_{prior}$. Interpolate the initial model to hi-resolution $m_0^{hires} = T\, m_0$. Model the seismic response to obtain the FMS calculated gathers $d_{kj}^{calc}$ and calculate the data likelihood function $L(m_0)$.
7. Draw a candidate model perturbation $m_n^{can}$ from the prior PDF $\rho(m)$.
8. Interpolate the model configuration to hi-resolution scale $m_n^{hires} = T\, m_n^{can}$.
9. Numerically model the seismic response of the model configuration to obtain the FMS calculated gathers $d_{kj}^{calc}$ and calculate the data likelihood function $L(m_{n+1}^{can})$.
10. Apply a sampling algorithm (e.g. Metropolis-Hasting or rejection algorithm) to accept the candidate model configuration in the sampling set $m_{n+1} = m_n^{can}$ or reject it.
11. Make $n = n+1$ and repeat steps 7, 8, 9, 10, and 11 until data until a sufficiently large sample set is produced.

Figure 12:
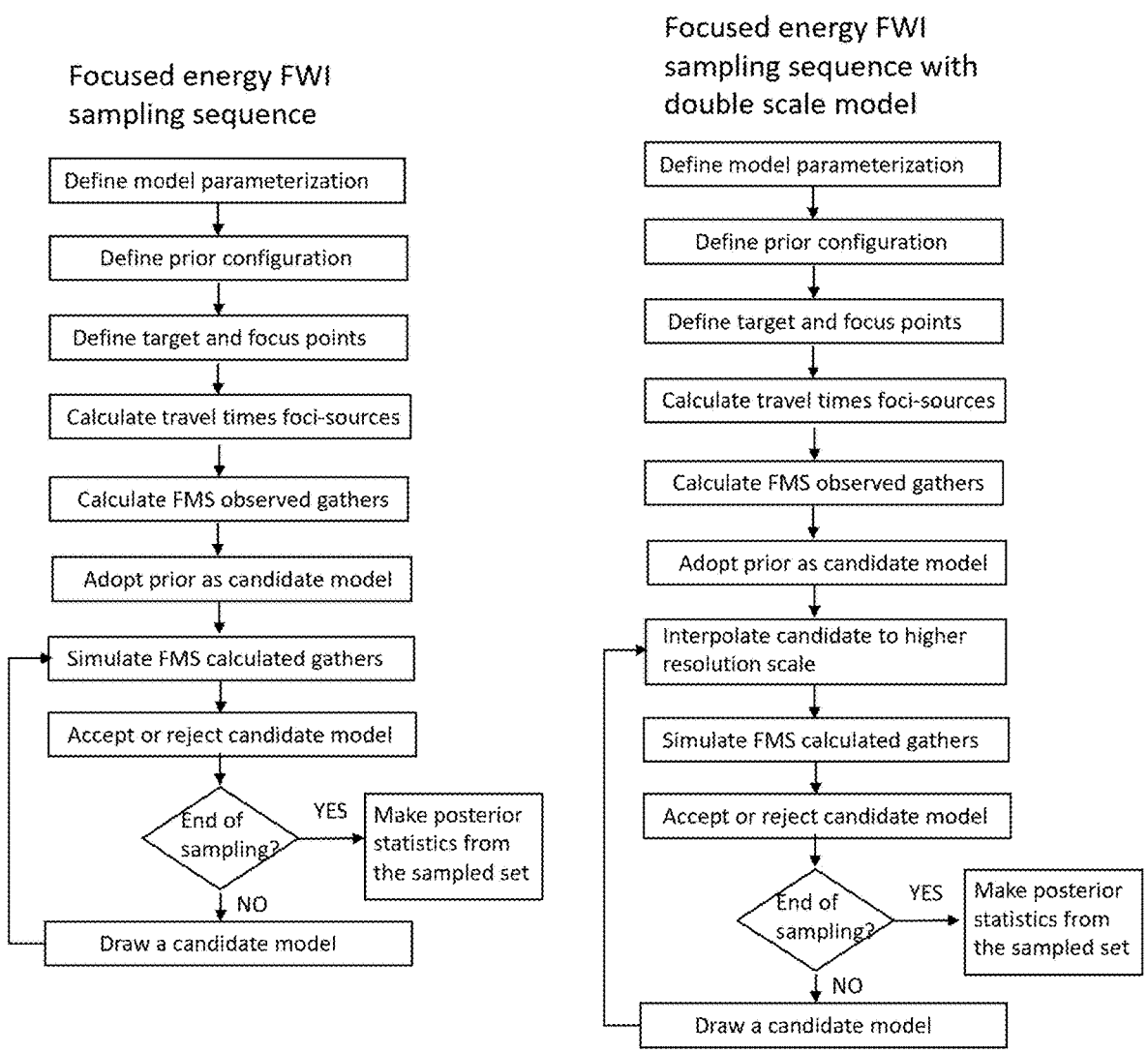
FIG. 12 shows preferred workflows for the focused macro source (FMS) full waveform inversion procedure disclosed herein following a sampling approach (FIG. 12A) and a sampling approach including a double scale model with a transform from the lower to the higher resolution scale (FIG. 12B).

The sequence is depicted in FIG. 12A for a single scale property model embodiment, and FIG. 12B for a preferred embodiment using a double scale model with a transformation between the two scales.

Figure 13:
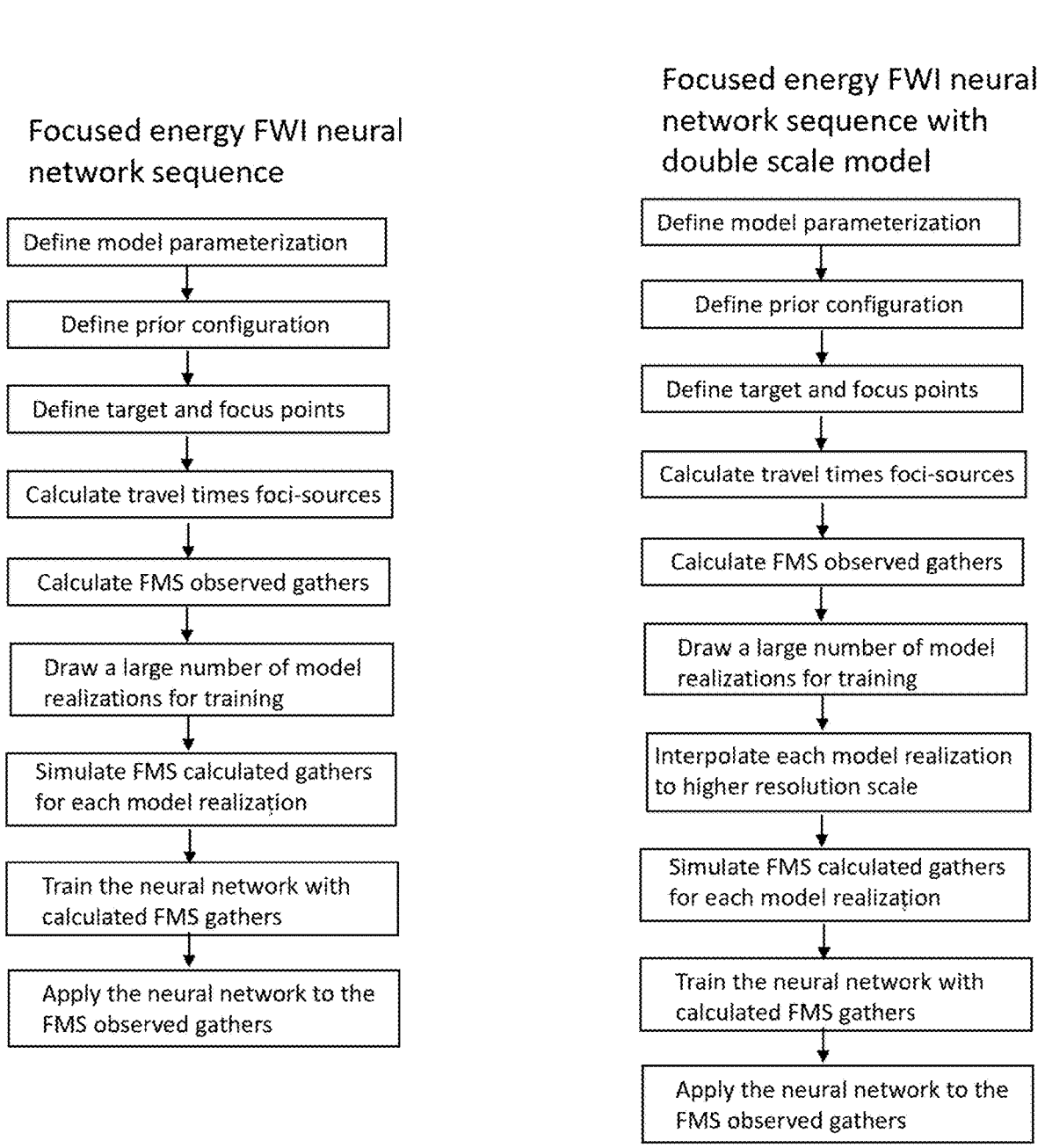
FIG. 13 shows preferred workflows for the focused macro source (FMS) full waveform inversion procedure disclosed herein following a neural network approach (FIG. 13A) and a neural network approach including a double scale model with a transform from the lower to the higher resolution scale (FIG. 13B).

Another option in the solution of the full waveform inversion is the neural network solvers. In this case, a large population of synthetic realizations of the model is generated in a first stage for training purposes. For each realization of the model the corresponding FMS calculated gather is then simulated. The population of model realizations and corresponding FMS calculated gathers are used to train the neural network in the prediction of the model property fields form the FMS data. Once the network has been trained, the neural network is applied to the observed FMS data to obtain as an output the predicted property model configuration. This sequence is depicted in FIG. 13A using a single scale property model, and FIG. 13B using a double scale model with a transformation between the two scales.

In the invention, the FMS focus points are distributed within a target zone of the earth volume, which may encompass a prospect or a producing reservoir. This distribution can be regular, random, or stratigraphically driven. As seismic energy is concentrated in the target zone, the parameter estimation is valid within the target zone whereas it remains damped towards the prior model outside the target zone. This is part of the conception of the method: spatially focusing the computation efforts in resolving the model parameters in a predefined target zone.

Various approaches can be used regarding the space coverage of the model update $\Delta m$:
1. updates can be zeroed in the region outside the target zone (i.e. model parameters remain with prior $m_{prior}$ constant values); this approach is a good option when computations depend on the dimensionality of $\Delta m$, as for the explicit calculation of the Jacobian or in a Monte Carlo sampling approach.
2. Updates can be calculated for all the spatial extend of the volume, with the understanding that the zone outside the target area will be under-estimated and biased towards the prior information, because the reduced seismic energy intensity.
3. Hybrid weighting strategies to equalize the energy intensity footprint in the model updates within the target zone, progressively reducing the weighting in an intermediate zone and zeroing the model updates in a most external zone.

The calculation of the FMS and FMS observed gathers has been described above before the loop of optimization model updates (sampling or neural network predictions) occurs. In addition, the FMS and FMS observed gathers can be recalculated at some intermediate points of the update (sampling or neural network predictions) iterations cycle to take advantage of the improvements of the current model configuration in updating the focus to point sources travel times and improve the FMS and FMS observed gathers.

The described embodiments above are exemplary implementations of the disclosed invention and not an exhaustive description of all the possible embodiments, which may include as previously explained, diverse types of wave phenomena, algorithms for solving the forward wave propagation, algorithms for solving the inverse problem, types of propagation media, and intended applications.

REFERENCES

U.S. Pat. No. 9,244,181
U.S. Pat. No. 9,702,998
U.S. Pat. No. 8,775,143
U.S. Pat. No. 10,310,123
Asnaashari, A., R. Brossier, S. Garambois, F. Audebert, P. Thore, and J. Virieux, 2013, Regularized seismic full waveform inversion with prior model information: Geophysics, 78, no. 2, R25-R36.
Barnes, Ch., and M. Charara, 2009, The domain of applicability of acoustic full-waveform inversion for marine seismic data: Geophysics, 74, no. 6, WCC91-WCC103.
Barnes, Ch., M. Charara, and T. Tsuchiya, 2010, Feasibility study for an anisotropic full waveform inversion of crosswell seismic data: Geophysical Prospecting, 56, 897-906.
Bosch, M., 2017, Seismic, rock-physics, spatial models, and their integration in reservoir geophysics, SEG online Encyclopedia of Exploration Geophysics, https://library.seg.org/doi/pdf/10.1190/1.9781560803027.entry7
Cordua, K. S., T. M. Hansen, and K. Mosegaard, 2012, Monte Carlo full-waveform inversion of crosshole GPR data using multiple-poing geostatistical a priori information, Geophysics, 77, H19-H31.
Ernst, J. R. A. G. Green, H. Maurer, and K. Holliger, 2007, Application of a new 2D time-domain full-waveform inversion scheme to crosshole radar data, Geophysics, 72, J53-J64.

Gauthier, O., J. Virieux, and A. Tarantola, 1986, Two-dimensional nonlinear inversion of seismic waveforms: Numerical results: Geophysics, 51, no. 7, 1387-1403.

Guitton, A., G. Ayeni and E. Diaz, 2012, Constrained full-waveform inversion by model reparameterization, R117-127.

Jia, H. T., T. Takenaka, and T. Tanaka, 2002, Time-domain inverse scattering method for cross-borehole radar imaging: IEEE Transactions on Geoscience and Remote Sensing, 40, 1640-1647.

Lailly, P., 1983, The seismic inverse problem as a sequence of before stack migrations, In Conference on inverse scattering: Theory and applications, 206-220. Society of Industrial and Applied Mathematics, Philadelphia.

Liu, D. C. and J. Nocedal, 1989, On the limited-memory BFGS method for large scale optimization, Mathematical Programming, 45, 503-528.

Mancini, F., K. Prindel, T. Ridsdil-Smith, and J. Moss, 2016, Full-waveform inversion as a game changer: Are we there yet?: The Leading Edge, 35, no. 5, 445-451.

Moghaddam, M., W. C. Chew and M. Oristaglio, 1991, Comparison of the Born iterative method and Tarantola's method for an electromagnetic time-domain inverse problem, International Journal of Imaging Systems and Technology, 3, 312-333.

Monteiller, V., S. Chevrot, D. Komatitsch, and Y. Wang, 2015, Three-dimensional full waveform inversion of short-period teleseismic wavefields based upon the SEM-DSM hybrid method, Geophysical Journal International, 2002, 811-827.

Mora, P., 1987, Nonlinear 2-D elastic inversion of multi-offset seismic data: Geophysics, 52, 1211-1228.

Nocedal, J., and S. Wright, 2006, Numerical Optimization, Springer, LCCN: 2006923897.

Operto, S., Y. Gholami, V. Prieux, A. Ribodetti, R. Brossier, L. Metivier, and H. Virieux, 2013, A guided tour of multiparameter full-waveform inversion with multicomponent data: From theory to practice: The Leading Edge, 32, no. 9, 1040-1054.

Owusu, J. C., O. Podgornova, M. Charara, S. Leaney, A. Campbell, S. Ali, I. Borondin, L. Nutt, and H. Menkiti, 2015, Anisotropic elastic full-waveform inversion of walkaway VSP data from the Arabian Gulf: Geophysical Prospecting, 64, 38-53.

Pica, A., J. P. Diet, and A. Tarantola, 1990, Nonlinear inversion of seismic reflection data in a laterally invariant medium: Geophysics, 55, no. 3, 284-292.

Queiber, M., and S. Singh, 2013, Full waveform inversion in the time lapse mode applied to $CO_2$ storage at Sleipner: Geophysical Prospecting, 61, 537-555.

Raknes, E. B., and B. Arntsen, 2015, A numerical study of 3D elastic time-lapse full-waveform inversion using multicomponent seismic data: Geophysics, 80, no. 6, R303-R315.

Tarantola, A., 1984, Inversion of seismic reflection data in the acoustic approximation: Geophysics, 49, 1259-1266.

Tarantola, A., 1986, A strategy for nonlinear elastic inversion of seismic reflection data: Geophysics, 51, 1893-1903.

Versteeg, R., 1994, The Marmousi experience: Velocity model determination on a synthetic complex data set, The Leading Edge, 927-936

Vigh, D., and E. W. Starr, 2008, 3D prestack plane-wave, full-waveform inversion: Geophysics, 73, no. 5, VE135-VE144.

Virieux, J., A. Asnaashari, R. Brossier, L. Metivier, A. Ribodetti, W. Zhou, 2017, Seismic Inversion, SEG online Encyclopedia of Exploration Geophysics, https://library.seg.org/doi/10.1190/1.9781560803027.entry6

Virieux, J., and S. Operto, 2009, An overview of full-waveform inversion in exploration geophysics: Geophysics, 74, no. 6, WCC1-WCC26.

What is claimed is:

1. A computer-implemented method of Full Waveform Inversion for estimating at least one subsurface property using seismic survey data collected from an array of seismic sources and receivers, employing the simulation of at least one seismic source that focuses the seismic energy intensity (i.e., Focused Macro Source) towards a specific zone of the surveyed earth volume, comprising:

a) defining a prior configuration of the at least one subsurface property, a prior configuration of the seismic velocity field, a target zone of the earth medium, and at least one focus point within that zone;

b) using the prior seismic velocity field to calculate travel times from the at least one focus point to each of the sources in the seismic survey array;

c) using the calculated travel times to construct at least one multi-point seismic focused macro source (FMS) for each focus point, wherein the total number of constructed FMSs is a fraction of the total number of seismic sources in the survey array, resulting in savings in the computational cost of the full waveform inversion proportional to that fraction;

d) using the superposition principle, calculated travel times, and recorded seismic data to generate, for each FMS, a corresponding seismic FMS observed gather that concentrates the seismic energy intensity towards the target zone, thereby producing a maximal data sensitivity within the target zone;

e) numerically simulating the FMS calculated gather corresponding to each of the FMSs;

f) utilizing both the FMS observed gathers and the corresponding FMS calculated gathers in a Full Waveform Inversion method to estimate the said at least one subsurface property within the target zone, thereby reducing computational cost; and g) employing the estimated at least one subsurface property to characterize the subsurface formations, explore the presence of natural resources, and/or assist in the extraction or injection of fluids into the subsurface formations;

wherein the at least one subsurface property forms an image describing the earth medium sub-volume where seismic intensity was concentrated by the FMSs.

2. The method of claim 1, wherein the recorded data set comprises data from at least one of a seismic wave, an elastic wave, an acoustic wave, a poro-elastic wave, a visco-elastic wave, a sonic wave, an ultrasonic wave, and a combination thereof.

3. The method of claim 1, wherein the recorded data set comprises data from at least one of a body wave, a surface wave, a diving wave, a diffracted wave, a reflected wave, a refracted wave, and a combination thereof.

4. The method of claim 1, wherein the location of at least one source and the location of at least one receiver are interchanged using the reciprocity principle.

5. The method of claim 1, wherein the earth medium has a volume and the target zone has a volume that is at least a part of the volume of the earth medium.

6. The method of claim 1, wherein the focus-points are arranged in a regular configuration, a random configuration, a pseudo-random configuration, a configuration oriented by at least one point of interest, a configuration oriented by at least one surface of interest and a combination of thereof.

7. The method of claim 1, wherein step (b) includes an amplitude calculation in addition to a travel time calculation.

8. The method of claim 1, wherein the full wave form inversion method is one of an optimization method, a sampling method, a neural network method, a genetic method, a hybrid method, and a combination thereof.

9. The method of claim 1, wherein the estimation in step f) consists of at least one of a value, a probability density, a probability distribution, a posterior statistic, a median, a realization, an uncertainty measure, a histogram, a probability, and a combination thereof.

10. The method of claim 1, wherein at least one property field is parameterized in a double-scale grid, with the finer grid employed for the seismic numerical simulation and the coarser grid employed for the inversion calculations, both scales coupled by a change of scale transform, thereby improving the precision of the seismic modeling and reducing the computational cost of the seismic inversion.

11. The method of claim 1, wherein the at least part of the recorded data set has been at least one of processed, transformed, interpolated, and a combination of thereof, before step (g).

12. The method of claim 1, wherein at least one of the steps (a), (b), (c), (d), (e), (f) and (g) are repeated at least one time.

13. A computer-implemented method of Full Waveform Inversion for estimating at least one subsurface property using seismic survey data collected from an array of seismic sources and receivers, employing the simulation of at least one convergent seismic source that focuses the seismic energy intensity (i.e. Convergent Focused Macro Source) towards a specific zone of the surveyed earth volume, comprising:
  a) defining a prior configuration of the at least one subsurface property, a prior configuration of the seismic velocity field, a target zone of the earth medium and at least one focus point within that zone;
  b) using the prior seismic velocity field to calculate travel times from the at least one focus point to each of the sources in the seismic survey array;
  c) using the calculated travel times to construct at least one convergent seismic focused macro source (CFMS) for each focus point, wherein the total number of constructed FMSs is a fraction of the total number of seismic sources in the survey array, resulting in savings in the computational cost of the full waveform inversion proportional to that fraction;
  d) using the superposition principle, calculated travel times, and recorded seismic data to generate, for each CFMS, a corresponding seismic CFMS observed gather that concentrates the seismic energy intensity towards the target zone, thereby producing a maximal data sensitivity within the target zone;
  e) numerically simulating the CFMS calculated gather corresponding to each of the CFMSs;
  f) utilizing both the CFMS observed gathers and the corresponding CFMS calculated gathers in a Full Waveform Inversion method to estimate the said at least one subsurface property within the target zone, thereby reducing computational cos; and
  g) employing the estimated at least one subsurface property to characterize the subsurface formations, explore the presence of natural resources, and/or assist in the extraction or injection of fluids into the subsurface formations;
  wherein the at least one subsurface property forms an image describing the earth medium sub-volume where seismic intensity was concentrated by the CFMSs.

14. The method of claim 13, wherein the recorded seismic data set comprises at least one of data traces, multiplexed data, demultiplexed data, shot-gathers, receiver-gathers, common midpoint (CMP) gathers, common depth point (CDP) gathers, pre-stack gathers, partial stack gathers, angle gathers, processed traces, processed gathers, transformed traces, transformed gathers, and a combination thereof.

15. The method of claim 13, wherein the update to the at least one property field in step (f) is calculated by at least one of a gradient method, an adjoint seismic operator method, a conjugate gradient method, L-BFGS method, a Newton's method, a Gauss-Newton's method, a method that calculates the gradient of an objective function, a method that calculates the Hessian of an objective function, a genetic method, a particle swarm method, and a combination thereof.

16. The method of claim 13, wherein at least one of the steps (a), (b), (c), (d), (e), (f) and (g) are repeated at least one time.

17. A computer-implemented method of Full Waveform Inversion for estimating at least one subsurface property field using seismic survey data collected from an array of seismic sources and receivers, employing the simulation of at least two seismic beams that focuses the seismic energy intensity (i.e. Beam Focused Macro Sources) towards a specific zone of the surveyed earth volume, comprising:
  a) defining a prior configuration of the at least one subsurface property, a prior configuration of the seismic velocity field, a target zone of the earth medium and at least one focus point within that zone;
  b) using the prior seismic velocity field to calculate travel times from the at least one focus point to each of the sources in the seismic survey array;
  c) using the calculated travel times to construct at least two multi-point beam seismic focused macro sources BFMSs) for each focus point, wherein the total number of constructed BFMSs is a fraction of the total number of seismic sources in the survey array, resulting in savings in the computational cost of the full waveform inversion proportional to that fraction;
  d) using the superposition principle, calculated travel times, and recorded seismic data to generate, for each BFMS, a corresponding seismic BFMS observed gather that concentrates the seismic energy intensity towards the target zone, thereby producing a maximal data sensitivity within the target zone;
  e) numerically simulating the BFMSs calculated gather corresponding to each of the BFMSs;
  f) utilizing both the BFMS observed gathers and the corresponding BFMS calculated gathers in a Full Waveform Inversion method to estimate the said at least one subsurface property within the target zone, thereby reducing computational cost; and
  g) employing the estimated at least one subsurface property to characterize the subsurface formations, explore the presence of natural resources, and/or assist in the extraction or injection of fluids into the subsurface formations;
  wherein the at least one subsurface property forms an image describing the earth medium sub-volume where seismic intensity was concentrated by the BFMSs.

18. The method of claim 17, wherein the recorded seismic data set comprises at least one of data traces, multiplexed data, demultiplexed data, shot-gathers, receiver-gathers, common midpoint (CMP) gathers, common depth point (CDP) gathers, pre-stack gathers, partial stack gathers, angle gathers, processed traces, processed gathers, transformed traces, transformed gathers, and a combination thereof.

19. The method of claim 17, wherein the update to the at least one property field in step (f) is calculated by at least one of a gradient method, an adjoint seismic operator method, a conjugate gradient method, L-BFGS method, a Newton's method, a Gauss-Newton's method, a method that calculates the gradient of an objective function, a method that calculates the Hessian of an objective function, a genetic method, a particle swarm method, and a combination thereof.

20. The method of claim 17, wherein at least one of the steps (a), (b), (c), (d), (e), (f) and (g) are repeated at least one time.

* * * * *